United States Patent
Seiler

(10) Patent No.: US 10,127,625 B2
(45) Date of Patent: Nov. 13, 2018

(54) BANDWIDTH-EFFICIENT LOSSLESS FRAGMENT COLOR COMPRESSION OF MULTI-SAMPLE PIXELS

(71) Applicant: Intel Corporation, Santa Clara, CA (US)

(72) Inventor: Larry Seiler, Boylston, MA (US)

(73) Assignee: Intel Corporation, Santa Clara, CA (US)

(*) Notice: Subject to any disclaimer, the term of this patent is extended or adjusted under 35 U.S.C. 154(b) by 85 days.

(21) Appl. No.: 15/167,902

(22) Filed: May 27, 2016

(65) Prior Publication Data

US 2017/0345121 A1    Nov. 30, 2017

(51) Int. Cl.
| | |
|---|---|
| G06T 1/20 | (2006.01) |
| G06T 1/60 | (2006.01) |
| G06T 11/00 | (2006.01) |
| G06T 11/40 | (2006.01) |
| H04N 19/593 | (2014.01) |
| H04N 19/182 | (2014.01) |
| H04N 19/42 | (2014.01) |
| H04N 19/90 | (2014.01) |

(52) U.S. Cl.
CPC ............ *G06T 1/20* (2013.01); *G06T 1/60* (2013.01); *G06T 11/001* (2013.01); *G06T 11/40* (2013.01); *H04N 19/182* (2014.11); *H04N 19/42* (2014.11); *H04N 19/593* (2014.11); *H04N 19/90* (2014.11)

(58) Field of Classification Search
None
See application file for complete search history.

(56) References Cited

U.S. PATENT DOCUMENTS

2014/0267377 A1* 9/2014 Halstvedt ............... G06T 11/40
345/613

OTHER PUBLICATIONS

Larry, Seiler, "Bandwidth-Efficient Lossy Fragment Color Compression of Multi-Sample Pixels", U.S. Appl. No. 15/167,717, filed May 27, 2016, 129 Pages.

* cited by examiner

*Primary Examiner* — Saptarshi Mazumder
(74) *Attorney, Agent, or Firm* — Schiff Hardin LLP

(57) ABSTRACT

Described herein are technologies related to facilitate lossless compression for multi-sample color data of computer graphics that maximizes the apparent quality of pixels while avoiding a corresponding burden on memory and processor bandwidth.

17 Claims, 19 Drawing Sheets

FIG. 12A   GRAPHICS PROCESSOR COMMAND FORMAT
1200
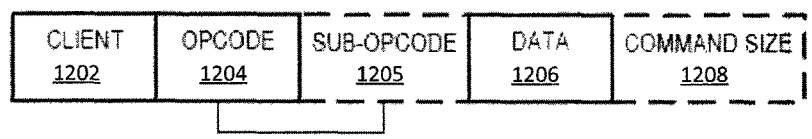
FIG. 12B   GRAPHICS PROCESSOR COMMAND SEQUENCE
1210
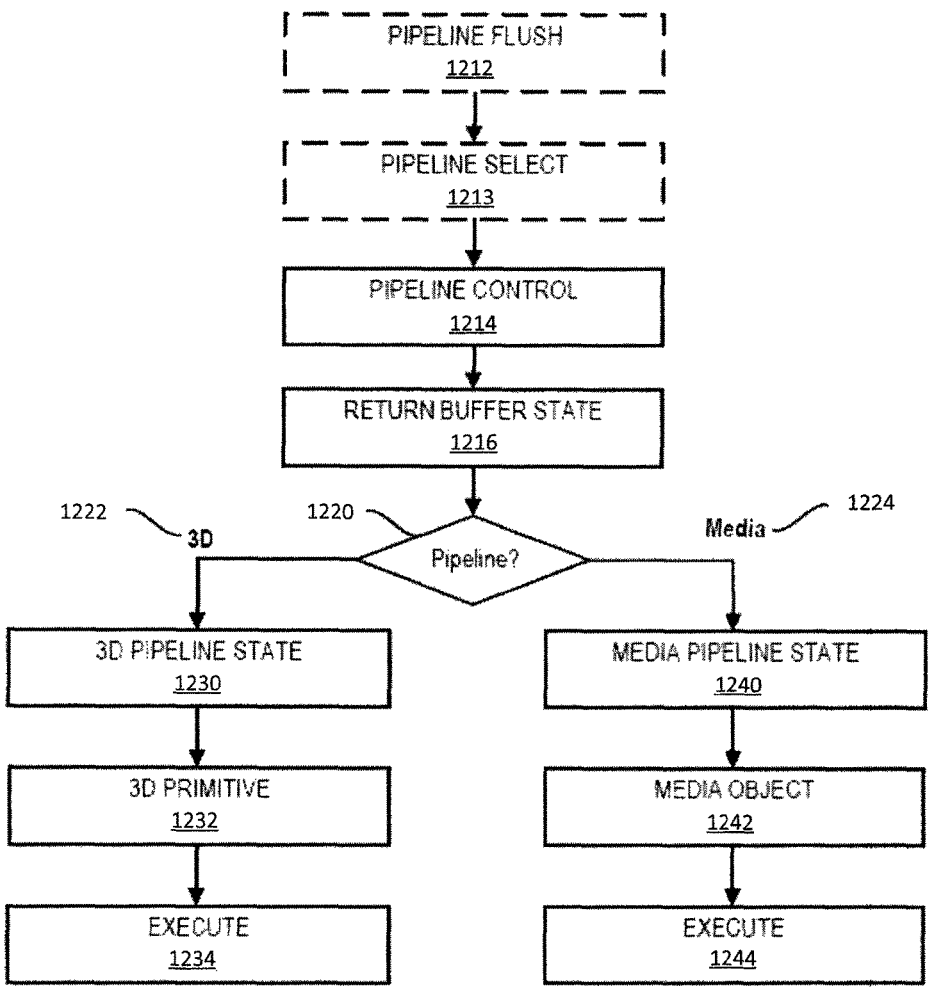

BANDWIDTH-EFFICIENT LOSSLESS FRAGMENT COLOR COMPRESSION OF MULTI-SAMPLE PIXELS

BACKGROUND

The quality of a rendered image is significantly improved with anti-aliasing. In computer graphics, aliasing is the process by which smooth curves and angled lines appear to be jagged because the resolution of the graphics representation is not high enough to represent a smooth curve or angled lines. Many conventional anti-aliasing techniques exist to reduce aliasing effects (e.g., jagged lines following boundaries between pixels) in rendering a two-dimensional (2D) image of three-dimensional (3D) object(s).

Super-sampling and multi-sampling are two common conventional anti-aliasing techniques. Super-sample anti-aliasing (SSAA) involves generating multiple samples within a pixel, where each sample is independently computed for coverage and shading. The shaded samples are stored within a frame buffer and blended for display. While super-sampling produces a very accurate and high-quality image, super-sampling is quite expensive because each pixel within a rendered image requires the computational processing of multiple fully shaded samples, and shading is typically the most expensive operation within the graphics rendering engine.

Multi-sample anti-aliasing (MSAA) techniques are a less expensive technique that uses one fully shaded color value and a coverage mask, rather than multiple fully shaded samples, to generate the multiple samples stored in the frame buffer that are ultimately blended to produce a pixel within a rendered image. This combination of a color and a sample mask is sometimes referred to as a fragment. Multi-sampling is commonly used because of the substantial cost-versus-performance benefit that is typically achieved without a significant loss in overall image quality. Although multi-sampling saves shader processing relative to super-sampling, multi-sampling still requires a frame buffer with multiple samples per pixel and the attendant bandwidth, which can limit application performance.

A common method to reduce the memory bandwidth required by multi-sample anti-aliasing is referred to as color fragment compression. Instead of replicating the fragment color to each sample marked in the fragment's sample mask, fragment compression stores the fragment colors and their sample masks. As a result, if a color covers N samples, it only needs to be accessed once (along with the coverage information) instead of N times. The coverage information is typically encoded as a fragment number per sample and is usually stored in a separate array called a control plane. If there are four samples per pixel, the control plane stores four 2-bit codes per pixel.

BRIEF DESCRIPTION OF THE DRAWINGS

FIG. 12A is a block diagram illustrating a graphics processor command format according to an embodiment and FIG. 12B is a block diagram illustrating a graphics processor command sequence according to an embodiment.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
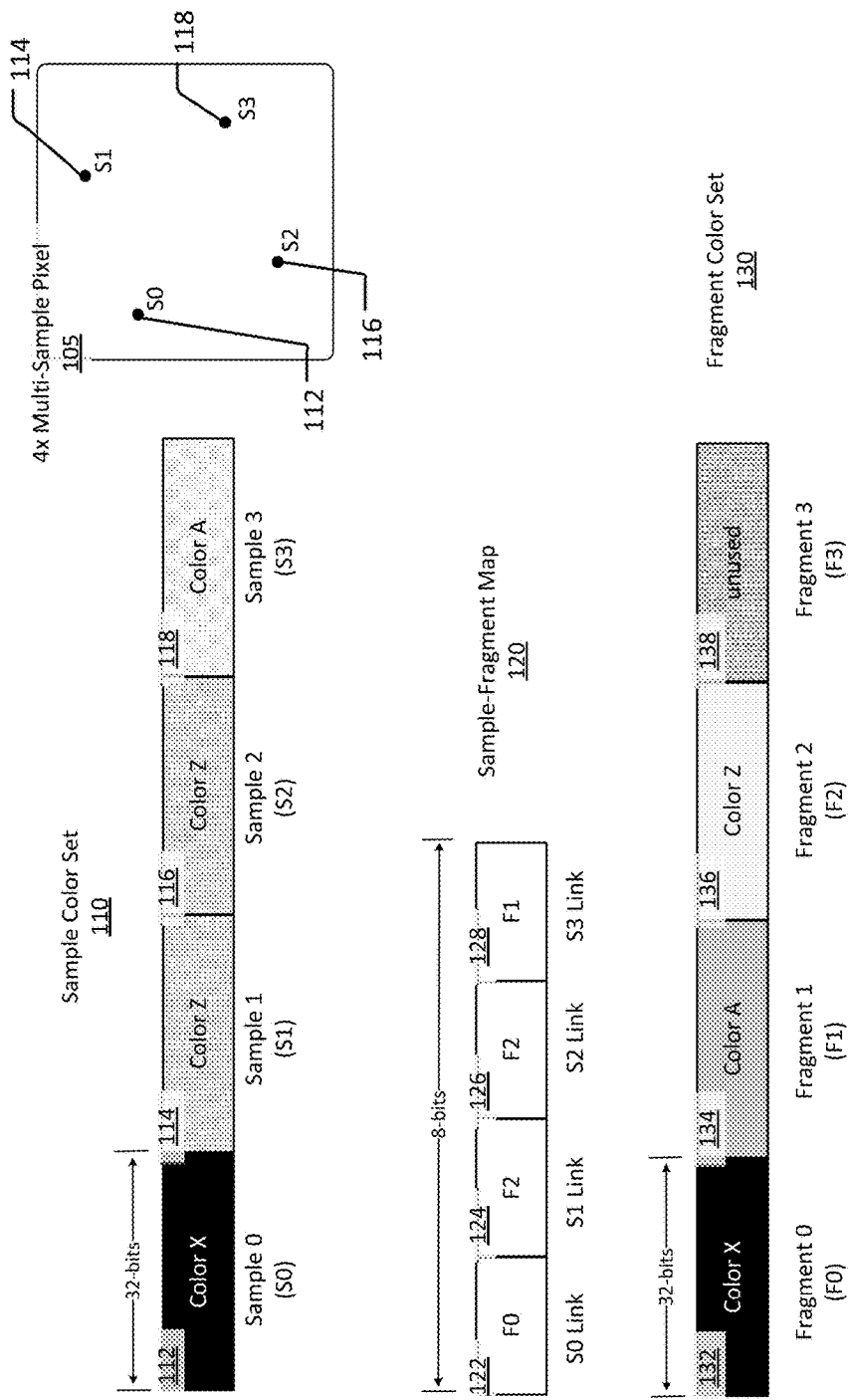
FIG. 1 illustrates an example of a 4× multi-sample pixel and its accompanying memory footprint in accordance with conventional fragment color compression techniques.

Described herein are computer graphics technologies to facilitate bandwidth-efficient lossless color compression of multi-sample pixels. More particularly, implementations described herein facilitate lossless color fragment compression of multi-sample pixels. More particularly still, such compression is accomplished using just a few (e.g., 1-4) bits of metadata per pixel, depending upon the total number of samples supported.

Color multi-sampling stores multiple per-sample color values in each pixel. Typically, all of the samples rendered from the same primitive (e.g., triangle) are set to the same color. Typically, fragment compression stores only the unique color values in each pixel, together with mapping data that specifies which fragment color is associated with each sample. The techniques described herein maximize the apparent quality of multi-sample pixels while avoiding the burden on memory bandwidth and footprint of storing and accessing a large number of mapping bits per pixel.

Super-Sampling

The quality of a rendered image is significantly improved with anti-aliasing. In computer graphics, aliasing is the process by which smooth curves and angled lines appear to be jagged because the resolution of the representation is not high enough to represent a smooth curve or angled lines. Many conventional anti-aliasing techniques exist to reduce aliasing effects (e.g., jagged lines following boundaries between pixels) in rendering a two-dimensional (2D) image of the three-dimensional (3D) object(s).

The simplest sampling-based anti-aliasing approach is called super-sample anti-aliasing (SSAA). Super-sampling involves generating multiple samples within a pixel, where each sample is independently computed for coverage and shading. The shaded samples are stored in a frame buffer and blended for display. With SSAA, the graphics device performs all of the necessary rendering calculations on all of the samples (e.g., 16 samples per pixel) for each pixel of an image. While this is highly effective at removing aliasing artifacts, it is impractical. It is expensive regarding computational and memory resources. It increases the pixel shading, rasterization, memory bandwidth, and memory capacity requirements many times per sample.

Typically, in SSAA, a selected number of samples per pixel of the final 2D image is selected (e.g., 2, 4, 8 or 16), and that number of samples are computed for the 3D object(s) for each pixel within the image plane of the final 2D image. Each sample specifies a color and other data associated with the pixel to which that sample belongs. The various colors of the samples of each pixel are employed to derive the colors given to each pixel in the final 2D image.

As a result, SSAA techniques are demanding of both memory and processor bandwidth. For example, if there are 8 samples per pixel, SSAA requires eight times the shader processing, eight times the bandwidth, and eight times the memory footprint. To gain the benefits of sampling at a finer resolution without such high memory/processor bandwidth requirements, conventional multi-sampling anti-aliasing (MSAA) techniques are used.

Multi-Sampling

Multi-sample anti-aliasing (MSAA) techniques offer an improvement over SSAA. Unlike the SSAA case, when processing a 3D object, only a single color is computed for each pixel overlapped by the object. That color is used for all samples in the pixel that are covered by the 3D object. But the coverage is computed once per sample, allowing for the same anti-aliasing quality regarding geometry edges as SSAA. This dramatically reduces the computation required for anti-aliasing but does not reduce the memory bandwidth requirement. Multi-sampling is commonly used because of the substantial cost-versus-performance benefit that is typically achieved without a significant loss in overall image quality.

When rendering 3D objects for display, each object is divided into a series of "fragments" that each represents the portion of the object that overlaps a specific pixel, together with a list or mask of which samples in the pixel that the object overlaps. A particular fragment is associated with a pixel if that fragment covers or at least partially covers the pixel. Fragment coverage is computed after various clipping operations are applied to the object and may or may not be applied after depth testing eliminates certain samples from set that are covered by the fragment. A single fragment color is used for all samples that the fragment covers.

To reduce the memory bandwidth requirements, conventional MSAA-based fragment compression techniques have been introduced. These techniques take advantage of the fact that 3D objects are typically rendered in fragments with a color and a sample mask. They also take advantage of the fact that a pixel typically is covered by only a small number of visible 3D objects, and therefore typically contains many samples with duplicate colors. This occurs because MSAA typically computes a single color per fragment (the portion of a 3D object that overlaps a pixel) and uses that color for all covered samples.

Multi-sample fragment compression reduces the memory bandwidth required for MSAA. Instead of replicating the fragment color to each sample marked in the fragment's sample mask, fragment compression stores the fragment colors and their sample masks. As a result, if a color covers N samples, it only needs to be accessed once (along with the coverage information) instead of N times. The coverage information is typically encoded as a fragment number per sample and is usually stored in a separate array called a control plane.

MSAA techniques are classified based on the number of samples designated per pixel. Theoretically, the higher the resolution of the MSAA technique, the better it is as anti-aliasing. Thus, it is better quality. A 2×MSAA has two samples per pixel. A 4×MSAA has four samples per pixels. 8× and 16×MSAA is also used, though above that number of samples there is typically very little perceived quality improvement from using more samples.

Not surprisingly, the improved quality comes at the cost of increased memory bandwidth demands, even with the benefits of MSAA fragment compression. Also, fragment compression does not reduce the memory footprint but instead increases it due to needing to store fragment mapping data. 4×MSAA is commonly used as a balance between the benefit of increasing visual quality and the cost of increased memory bandwidth and memory footprint, although aliasing artifacts are still clearly visible.

Fragment Compression Metadata

Conventional MSAA approaches store the mapping data as metadata within an array referred to as a control plane. For N samples, specifying the mapping from fragments to samples requires a fragment number per sample, which requires N*log(N) bits (in base 2). For example, 8-sample fragment compression requires 24 mapping bits, which is typically stored as 32 metadata bits because of the complexity of accessing memory words that are not a power of two in size. This metadata must be read before accessing the fragment color data and then written if the fragment coverage is modified. The read-write of this data occupies a significant amount of the bandwidth required to access a compressed fragment pixel.

Also, conventional approaches allow block-based lossless compression for color data but do not support using lossless compression of the fragment coverage mapping data. This technology described herein provides an efficient way to allow fragment compression and block-based lossless compression to both be used, including compressing the fragment mapping data.

FIG. 1 illustrates an example of a conventional fragment compression. This example includes an example 4× multi-sample pixel 105. This pixel 105 has four samples, which are labeled Sample 0 (S0 or 112), Sample 1 (S1 or 114), Sample 2 (S2 or 116), Sample 3 (S3 or 118).

For this example, the color values have a depth of 32-bits. The 32-bit sample color set 110 are stored in memory. This is how conventional MSAA techniques handle the colors of samples without regard for fragments. The discussion below introduces particular components of the conventional lossless fragment color compression techniques. It introduces the use of metadata for sample-to-fragment mapping and fragment color values.

Conventional multi-sample fragment compression stores only the unique per-triangle colors per pixel, together with a mapping of which fragment color to associate with each sample position. The sample-to-fragment map 120 is an example mapping of which fragment color is associated with each sample position.

For this pixel 105, there is a metadata memory block called sample-to-fragment map 120. For this example, the sample-to-fragment map 120 is 8-bits in size and is divided into four equally sized storage segments: S0 Link 122, S1 Link 124, S2 Link 126, and S3 Link 128. Of course, other versions may use a different number of bits for the sample-to-fragment map. Each segment is associated with a particular sample of pixel 105. For example, segment 122 is associated with sample 0 (i.e., S0). The value of segment 122 is a link to F0, which is segment 132.

The conventional approach for lossless fragment compression method replaces the sample color set 110 with a "fragment color set" 130. Like 110, it has four storage segments (e.g., 132, 134, 136, and 138). In both cases, each storage segment is designed to store a color value.

As depicted, F0 (132) has a designated color value of "Color X," F1 (134) has a designated color value of "Color A," F2 (136) has a designated color value of "Color Z," and F3 (138) has a no defined color value, since that fragment is not used to specify the colors of samples in the pixel. These fragment values and colors are for illustration purpose only. They are designed to illustrate a fragment compressed representation in 120 and 130 that results in the same color at each sample in pixel 105 as are illustrated in 110. For example, S1 and S2 share the same color, which is stored in both segments 114 and 116 in sample color set 110. Their shared color is stored only once in fragment color set 130, in segment 136, since links 124 and 126 for samples 1 and 2 both refer to fragment 2 in segment 136.

The conventional approach for lossless fragment compression of multi-sample color data takes advantage of the fact that typically multiple samples per pixel have the same color. The example in FIG. 1 shows three distinct fragment colors in the pixel for purposes of illustration. It is quite common for a pixel to be either entirely inside a triangle, in which case one fragment color is used for all of the samples, or on the edge between two triangles, in which case two fragment colors cover all of the samples. Typically more than two fragment colors are required only when a vertex of a triangle strip or mesh falls within the pixel.

Theoretically, the conventional multi-sample fragment compression approach reduces memory bandwidth compared to always storing a color per sample, since the average number of unique fragment colors per pixel is quite low.

However, that actual bandwidth reduction realized is much less in practice. One reason is because the memory access unit is larger than the pixel size. For example, it is common for modern CPUs to access memory in 64 B memory units, each of which stores 16 32-bit pixels. Because of this, if a single memory unit stored all of the fragment colors for a single pixel, then there would be no benefit to fragment compression. A common conventional alternative is for a memory unit to store the same fragment color for each of a block of pixels. This way, the number of accesses is determined by the maximum number of fragment colors in that block.

Another reason the actual bandwidth reduction realized is much less in practice is because conventional multi-sample fragment compression approaches need to read and write the sample-to-fragment map 120. This adds bandwidth relative to just reading the sample colors 110 or fragment colors 130. In some cases, the difference is quite large.

Consider, for example, a block of 8×MSAA pixels that each needs to be written with one 32-bit fragment color that fully covers the pixel. In this scenario, there is an 8:1 improvement in the memory bandwidth when accessing the fragment color. That is, an approach that does not use conventional fragment compression would need to access the color value (such as those of sample color set 110) for each of the eight samples of the 8× multi-sample pixel rather than the one color value of the sole fragment covering all of the samples in this scenario.

However, this is not the full picture of bandwidth needs. Reading this pixel requires reading the sample-to-fragment map 120, and changing the pixel in any way requires writing the sample-to-fragment map 120 metadata. For 8×MSAA, there need to be eight entries in the sample-to-fragment map, each of which must store at least log(8)=3 bits to select the fragment per pixel. Typically, this 24-bit sample-to-fragment map is stored as 32-bit values. So, for a write-only operation, this scenario has changed eight 32-bit writes per pixel (without fragment compression) to one 32-bit read (of the sample-to-fragment map 120) and two 32-bit writes per pixel (which includes writing a new color in the fragment color set 130 and writing an update to the map 120). So, the apparent improvement in the reduction of bandwidth drops from the theoretical 8:1 to the more realistic 8:3 or 2.67:1.

Improved Lossless Fragment Compression

The technology disclosed herein offers new and improved lossless fragment color compression techniques that eliminate much of the bandwidth loss of accessing the sample-to-fragment map, as well as reducing the memory footprint required to store metadata for fragment compression. Instead of using metadata to store the mapping of fragment colors to samples, the technology described herein utilizes metadata to specify the number of fragment colors stored in each pixel or whether the pixel is stored using sample colors. In some implementations, the pixel is stored in one of two ways:

A set of fragment colors and the sample to fragment mapping data, referred to as "fragment mode." There may be multiple fragment modes specifying different numbers of fragments per pixel.

A single color per sample, referred to as "sample mode,", which may be used if the fragment colors and sample to fragment mapping data do not fit in the pixel storage.

Figure 2:
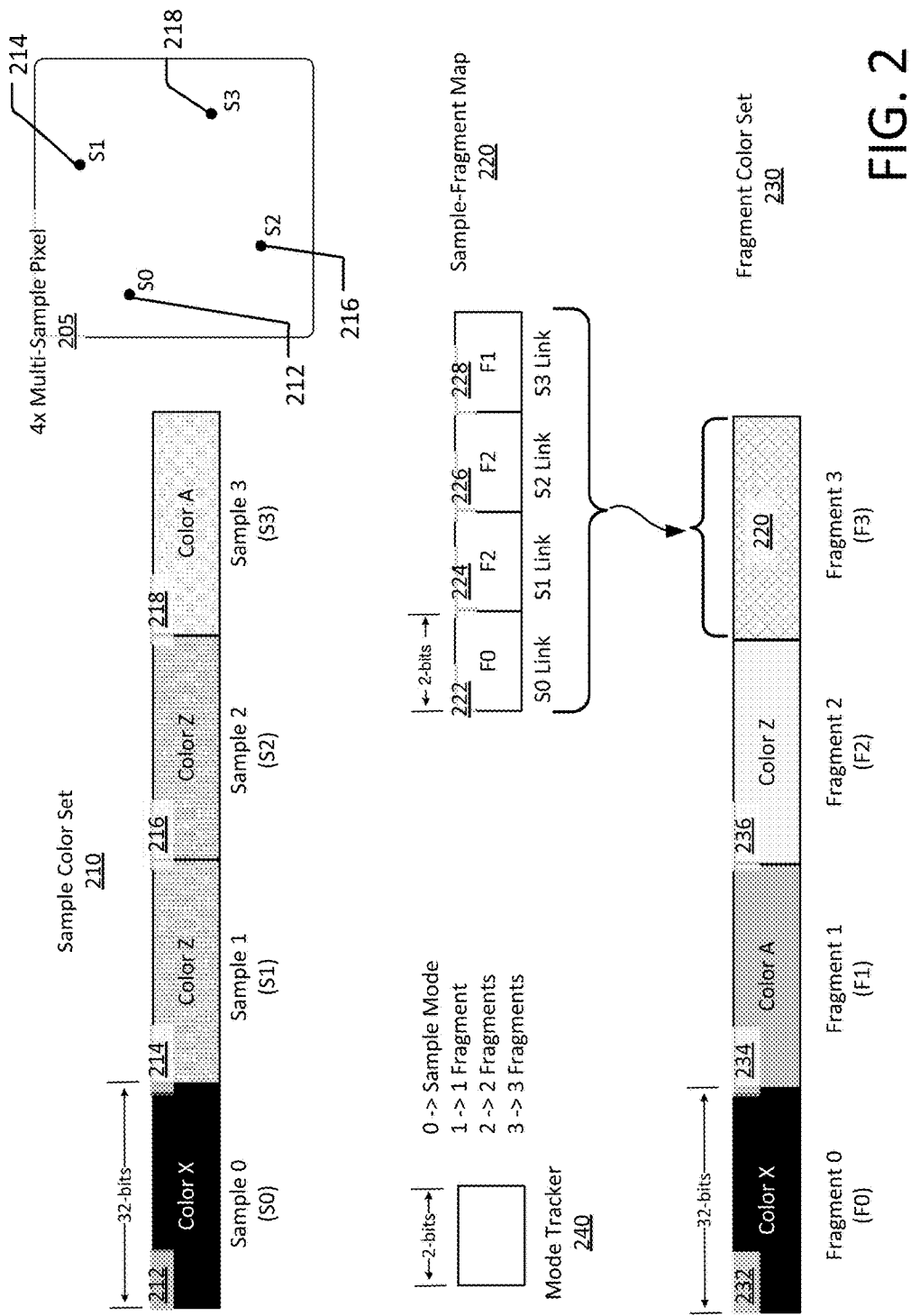
FIG. 2 illustrates an example of a 4× multi-sample pixel and its accompanying memory footprint in accordance with implementations as described herein.

FIG. 2 illustrates an example implementation of a lossless fragment compression by the technology described herein. This example includes an example 4× multi-sample pixel 205. This pixel 205 has four samples, which are labeled Sample 0 (S0 or 212), Sample 1 (S1 or 214), Sample 2 (S2 or 216), Sample 3 (S3 or 218). In this example, sample 0 has color X, samples 1 and 2 have color Z, and sample 3 has color A, which are the same color assignments used in FIG. 1. For this example, the color values are each stored in 32-bits, but other color value sizes may be supported The technology described herein performs multi-sampled fragment compression by storing per-pixel fragment-coverage metadata (e.g., mode tracker 240) that specifies either sample mode or fragment mode together with the number of fragments per pixel. If a fragment mode is selected. The fragment to sample mapping data (e.g., 220) is stored in the pixel fragment color set (e.g., 230).

As depicted FIG. 2, the sample-to-fragment map consists of a 2-bit fragment number 222, 224, 226 and 228 for each of the four samples. Each fragment number is associated with a specific sample in pixel 205. Other numbers of samples require a different number of map entries and a different number of bits per map entry.

Alternately, the mode tracker 240 may specify sample-mode, in which case this implementation stores the pixel as a separate color per sample (e.g., 210). This mode does not use fragment to sample mapping data (e.g., 220). This is how conventional MSAA techniques handle the colors of samples if fragment compression is not used.

FIG. 1 and FIG. 2 may be compared to understand some of the differences between the conventional approach and at least one implementation of the technology described herein. In both figures, there is a sample color set 110 and 210 and a fragment color set 130 and 230, each of which are able to store N color values for N-sample multisampling, in this case 4× multisampling. Both figures also include a sample to fragment map 120 and 220

However, in FIG. 1, the sample to fragment map 120 is stored as metadata, whereas in FIG. 2 the sample to fragment map 220 is stored as part of the fragment color set 230. Also, FIG. 2 introduces the Mode Tracker 240 which is stored as the fragment-coverage metadata. The mode tracker selects whether to store data in sample color set 210 or fragment color set 230.

Since fragment slot 3 of the fragment color set 230 stores the sample-to-fragment map, it is not possible to store four fragment colors using fragment mode. If a pixel requires four fragment colors, it is stored using sample-mode as shown in block 210. This allows each of the four samples to have separate colors in spite of storing the fragment to sample map 220 in the fragment color set 230 instead of storing it as metadata, as in traditional methods illustrated in FIG. 1.

While this example has four sample colors, fragment colors, and map entries to support 4×MSAA, other multi-sample counts can be represented using the corresponding number of sample colors, fragment colors, and map entries, and with each map-entry equal in size to the log of the number of samples per pixel, e.g. 4-bit map entries for 16×MSAA.

With 4×MSAA, sample-to-fragment map 220 occupies 8-bits and, therefore, fits into the fragment three slot in fragment color set 230 for any pixel size of 8-bits or larger. 8×MSAA requires, at least, eight 3-bit sample-to-fragment maps entries so that sample-to-fragment map 220 requires 24-bits. This fits in the fragment three slot for 32-bit or larger pixels. Therefore, sample-mode is employed when there are more than three samples in these cases.

For 16-bit pixels, the sample-to-fragment map does not fit into fragment slot 3. Instead, it will take two slots to store the map, such as fragment slots 2 and 3. The result is that for 16-bit pixels with 8×MSAA, fragment mode can store a maximum of two fragment colors before the pixel must be converted to sample mode.

In general, each number of samples has its own maximum sample-to-fragment map (i.e., sample-fragment map) size, which is determined by multiplying the number of samples times the bits required per link. E.g., 2*1=2 bits for 2×MSAA, 4*2=8 bits for 4×MSAA, 8*3=24 bits for 8×MSAA, and 16*4=64-bits for 16×MSAA. Depending on the pixel size, each of these cases requires reserving one or more fragment color slots to store the sample-to-fragment map, which limits the maximum number of fragments that can be stored before switching to sample-mode. In general, for N-sample MSAA, the full sample to fragment mapping data requires M=N*log(N) bits (in base 2). With P bits per pixel, the mapping data requires ceiling(M/P) fragment color slots.

In a special case, a single fragment covers the entire pixel. In that instance the Mode Tracker 240 specifies 1 fragment mode. In this case, the sample-to-fragment map 220 does not need to be stored in the fragment color set, since the fragment 0 color is used for all samples. As a result, both Sample Mode and 1 Fragment Mode may be supported for any number of samples and any number of bits per color.

Similarly, if there are only 2 fragment colors, the sample to fragment mapping data only needs to store 1 bit per sample to select which of the fragments is used. As a result, with N samples and a maximum of F fragments, the fragment to sample mapping data that needs to be stored in the fragment color set only occupies for M=N*log(F) bits. Also the number of fragments specified in the Mode Tracker means that a CG system can limit its memory to reading only the fragment colors that are actually in use when reading from the pixel.

The maximum number of fragments that can be stored in each pixel also depends on the number of bits of metadata (e.g., mode tracker 240). For example, with B bits of Mode Tracker metadata, the maximum number of fragment colors is $2^B-1$ fragment colors, since one code is reserved to specify Sample Mode. With 2×MSAA, for example, the Mode Tracker only requires a single bit per pixel, selecting either sample-mode or 1-fragment-mode. This size can be used for larger numbers of samples per pixel, in which case sample-mode is used unless a single fragment covers the entire pixel. A 2-bit Mode Tracker allows selecting sample-mode or 1, 2, or 3 fragment-mode. This is sufficient for 4×MSAA and can be used for 8× and 16×MSAA as well. To allow more than 3 fragment colors per pixel, 8× and 16×MSAA can use a 4-bit Mode Tracker per pixel, to specify up to 15 fragment colors in the fragment color set.

The implementations of the technology described herein needs dramatically fewer metadata bits than the conventional approaches for storing and accessing. The memory footprint of 4-sample MSAA stores four sample colors per pixel, as depicted by sample colors sets 210 or the fragment color set 230 of pixel 205. The memory footprint also includes a 2-bit mode tracker value 240 per pixel. This is a significant reduction from storing the 8-bit sample-to-fragment map as a separate array of metadata. Even larger improvements are achieved for 8×MSAA (32-bit fragment sample map vs. 2-bit or 4-bit Mode Tracker) and 16×MSAA (64-bit fragment sample map vs. 4-bit Mode Tracker).

As a result, this new approach as described herein reduces the bandwidth requirements for conventional fragment compression, as well as reducing the required memory footprint. For example, with 32-bit pixels at 8×MSAA, reading a pixel covered by a single fragment color requires two 32-bit reads using conventional fragment compression: one to access the 32-bit sample to fragment map and the other to access the 32-bit fragment color.

With this new approach, a CG system can minimize its memory reads to acquire sufficient information to accomplish fragment compression. When a single fragment color covers the whole pixel, the CG system may read at most a 4-bit Mode Tracker (⅛ the size of a 32-bit pixel) and a single 32-bit word. Note that if the Mode Tracker bits indicate one fragment, it is not necessary to read the sample-to-fragment map. As a result, the bandwidth benefit is 2:1.125 or about 1.8:1.

Writing a single color to the whole 8×MSAA pixel has an even larger benefit. Conventional fragment compression reads the sample-to-fragment map before the coverage is known, after which the color and the new sample-to-fragment map must both be written. As a result, this operation requires reading and then writing the 32-bit sample to coverage mapping value and writing the 32-bit color value.

However, for this new technique described herein, the Mode Tracker (e.g. 240) is read and written, but the sample-to-fragment map does not need to be accessed. This results in at most a 4-bit read and write with a 32-bit write. As a result, the bandwidth benefit is 3:1.25 or 2.4:1. The benefit varies with the number of samples and the number of fragment colors.

Storing the sample-to-fragment map (i.e., fragment-sample map) in the pixel also has a benefit when lossless block compression is combined with MSAA fragment compression. In general, lossless block compression attempts to compress fixed size blocks of memory and stores metadata to indicate how much compression was achieved. For example, there could be two metadata bits to select 1:1, 2:1 or 4:1 compression. Lossless block compression can be applied to MSAA data, even if fragment compressed. The extra latency to access the block compression metadata can be overlapped with the latency required to read the Mode Tracker (240) or sample-to-fragment map (120) metadata.

However, it would be much costlier to compress the sample-to-fragment map metadata in this fashion, since that would require an additional memory latency to access block compression metadata for the sample-to-fragment map. Using the one or more implementations of the technology described herein described herein, the Mode Tracker metadata is small enough that further compression is not likely to be necessary. Since the sample-to-fragment map is stored along with the colors, lossless block compression can be used to compress both the fragment/sample colors and the mapping data (e.g., 210, 220, 230).

Example Methnological Implementation

Figure 3A:
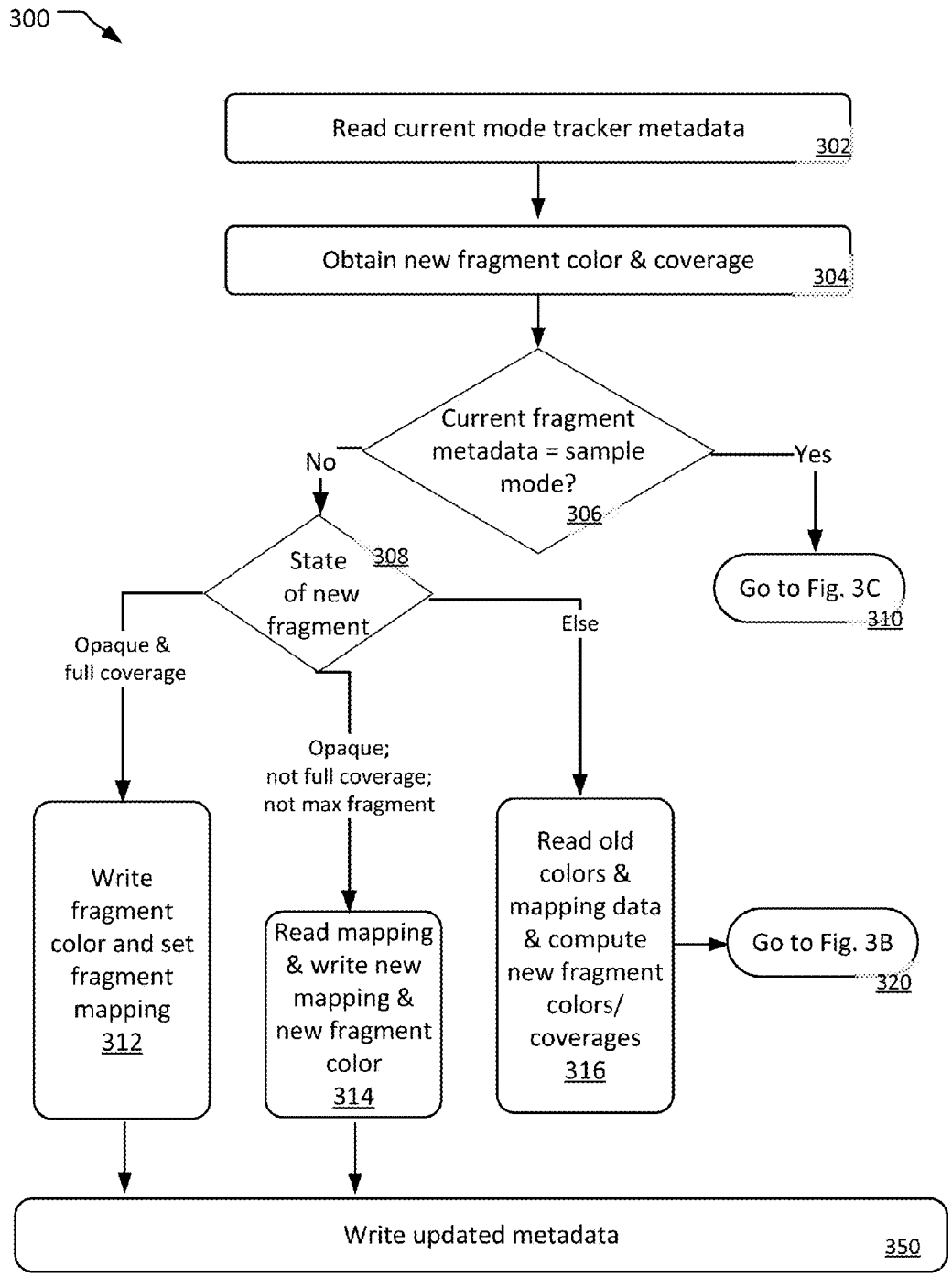
FIGS. 3A-3C illustrates an example methodological implementation in accordance with the technology described herein.
Figure 3B:
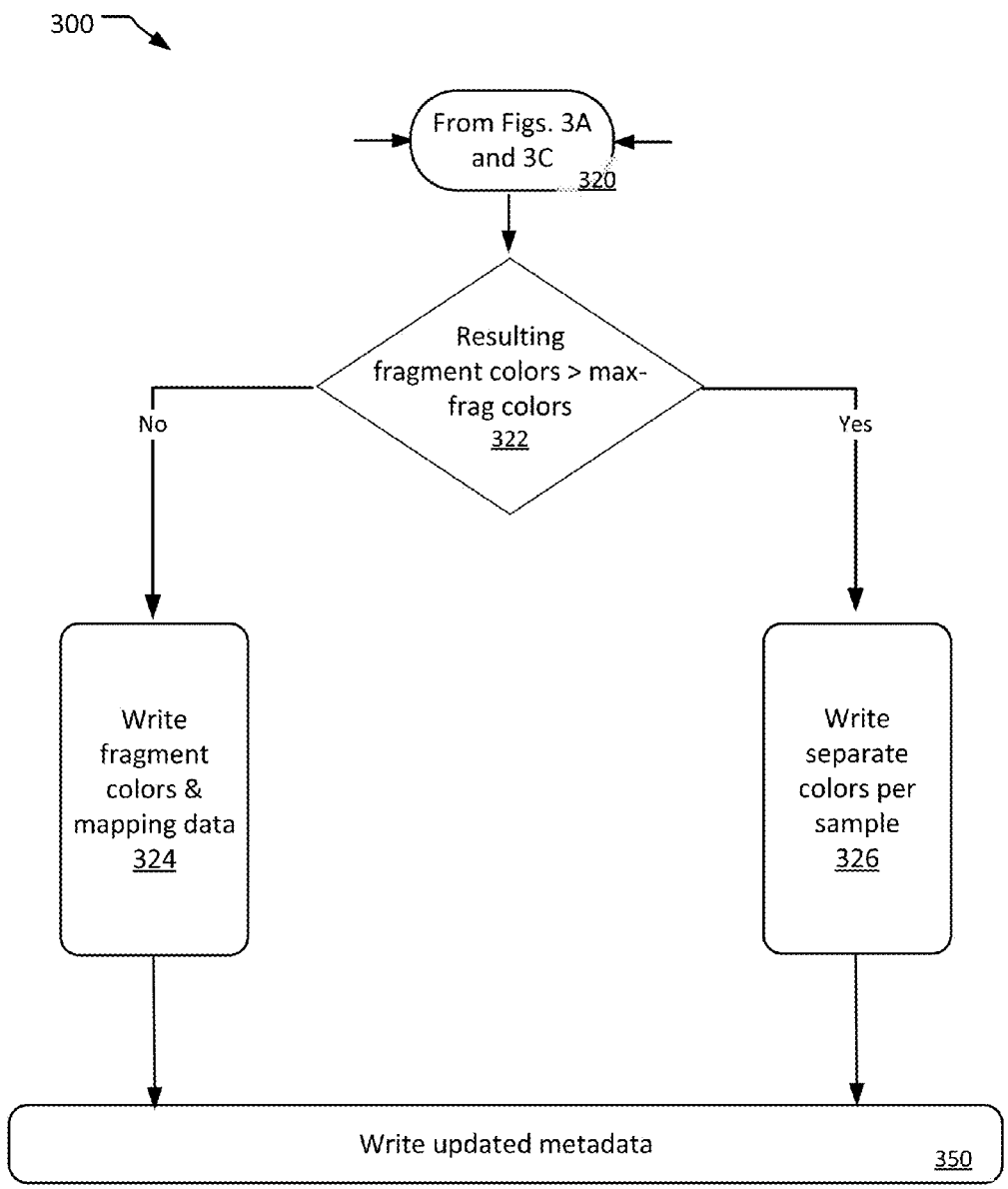
Figure 3C:
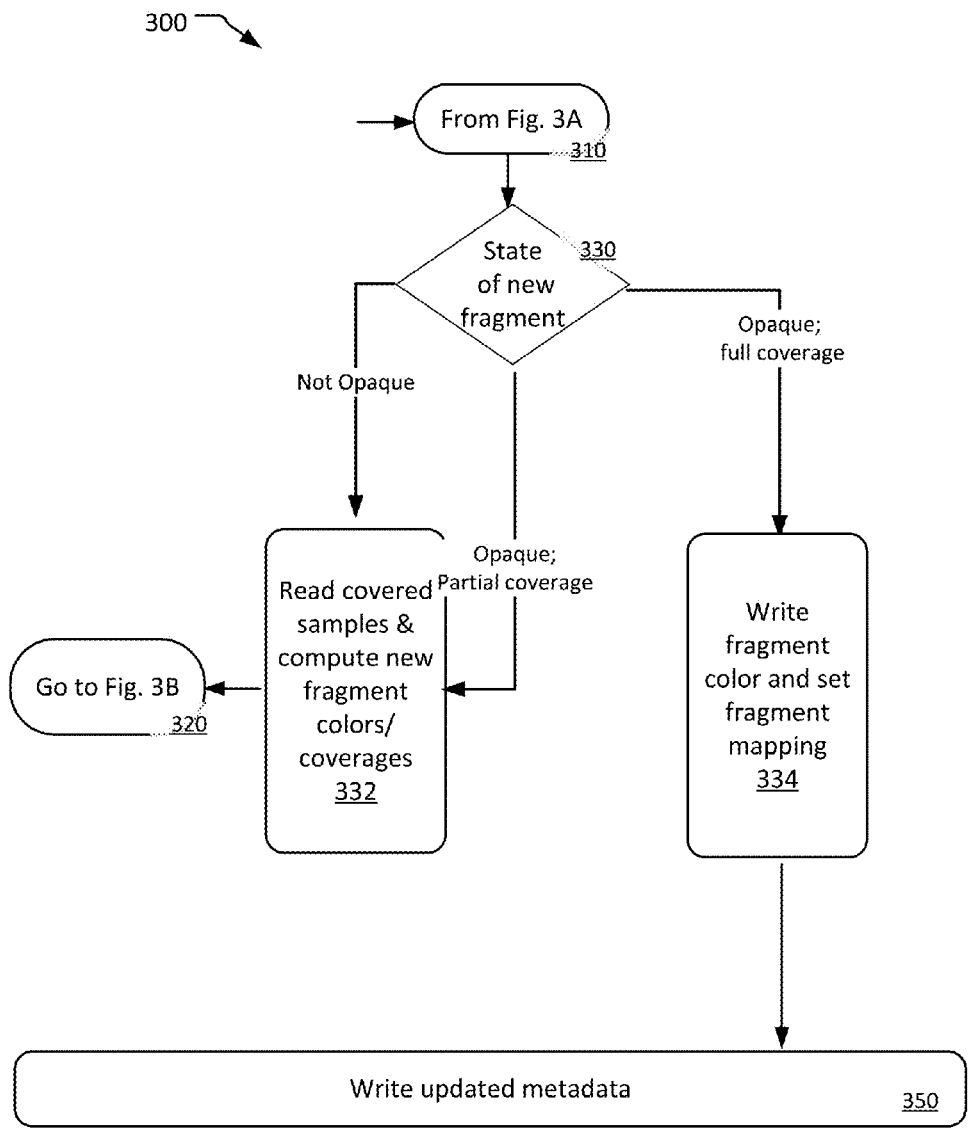

FIGS. 3A-3C show an example process 300 illustrating the technology as described herein. The example process 300 may be implemented as part of a computer graphics (CG) system. The process 300 is implemented when a new fragment is at least partially covering a multi-sample pixel. Note that the reads and writes specified as part of this process may be consolidated using caches. Caches are particularly useful for the Mode Tracker, since it uses so few bits per pixel. Also, note that simplifications of this process may also be implemented that exclude the optimized cases.

For this example process 300, the memory includes the following stored in association with a rasterized multi-sample pixel: mode-tracker metadata that includes the mode-indicator value that specifies how data is stored in the pixel; for sample mode sample data of the multiple samples of the rasterized multi-sample pixel; for fragment modes fragment data of multiple fragments that, at least, partially cover the rasterized multi-sample pixel, wherein the fragment data includes a color value for each of the multiple fragments; and for fragment modes, a sample-to-fragment map that links each sample of the rasterized multi-sample pixel to one of the fragments of the multiple fragments.

At block 302, a CG system obtains the address of a pixel that is being rendered and reads the current fragment-coverage metadata (e.g., mode tracker 240). This may also be described as the system reading a mode-tracker value from the mode-tracker metadata in the memory. The following are examples of modes that might be indicated by the fragment-coverage metadata:

0→Sample mode (separate color per sample)
1→one fragment coverage
2→two fragment coverage
3→three fragment coverage.

Of course, in other alternative implementations, the modes may vary. For example, there may be only two modes that are sample mode and one fragment mode. In another example, there may be eight modes, such as a sample mode and seven other modes that each represents coverage of one to seven fragments.

At block 304, the CG system obtains information (i.e., fragment data) regarding a new fragment that is at least partially covering the pixel. This block may also be described as including: obtaining the computed fragment color to be applied to (i.e., covers) a subset of samples of the pixel, as well as an indication of which samples the fragment color should be applied to. This block also determines whether the fragment should be applied to the pixel as an opaque or write-only operation that does not depend on the current colors of the pixel's samples, or whether a blend mode is employed.

A blend mode involves the fragment being applied to the pixel as a non-opaque or read-write operation that involves combining the new fragment color with the pixel's sample colors. A blend mode combines a new color into existing colors rather than overwriting or replacing them. Examples of blend operations include adding the two colors, taking the minimum or maximum, or other arithmetical operations that are known in the art.

Some implementations may perform the actions of blocks 302 and 304 in that particular order because of the relative time it takes to perform the actions of each block. For example, the memory latency of reading the metadata (of block 302) may occur during the obtaining (e.g., computing) the new fragment (of block 304).

Other implementations may obtain coverage information prior to performing the actions of block 302. This may occur for example on a clear operation that uses full pixel coverage for every pixel that is touched, but could also occur in other cases. If the operation is known to be write-only to all samples of the pixel prior to performing block 302, then a further optimization is available that is not shown in FIG. 3. In such a case processing can skip directly to block 312 and write the fragment color.

At block 306, the CG system determines whether the current pixel is in sample mode. This determination is based upon the current fragment-coverage metadata (e.g., mode tracker 240) as read in block 302. If it is in sample mode, the process 300 proceeds to block 310, which represents a continuation of the process 300 as depicted in FIG. 3C. If the CG system does not determine that the current coverage is sample mode (thus, it is in fragment mode), then the process 300 proceeds to block 308.

At block 308, the CG system determines whether the new fragment fully covers the pixel, that is, the fragment covers all samples in the pixel, and whether the fragment operation is opaque, that is, it doesn't depend on the current contents of the pixel. If both conditions are true, then the process 300 continues to block 312.

At block 312, the CG system writes the color of the new fragment in a manner that indicates that that this color of this new fragment covers all of the samples of the pixel. For example, it may write "color X" into the fragment 0 slot (232) of fragment color set 230. If the fragment mapping is tracked by internal logic, it is set to indicate that one fragment covers all samples of the pixel, but no fragment mapping data needs to be written to memory. Then, at block 350, the CG system updates the fragment-coverage metadata (e.g., mode tracker 240) accordingly. For example, it writes a binary value of "01" to indicate one fragment covers all of the samples of the pixel 205. At this point, process 300 is done for this new fragment.

Described in another way, at block 312, the CG system writes the color of the new fragment of the pixel, and it sets the mapping mode to indicate one fragment coverage (e.g., 1-fragment mode). The actions of blocks 312 and 350 when the state is opaque and fully covered produces a subsequent efficiency and effectiveness concerning metadata access. With conventional approaches, in a similar situation as depicted in block 312, the system must read and write the full sample-to-fragment map, instead of reading and writing the much smaller Mode Tracker metadata as in this one or more implementations of the technology described herein.

Also, with conventional approaches, the entire sample-to-fragment map must be read for subsequent reads of the pixel. But with this new approach and in this situation, the CG system knows that the pixel is in a 1-fragment mode (based upon reading the mode tracker 240). Because of this, the system only needs to read the fragment color entry (e.g., slot 232) and does not need to read any fragment mapping data entry (e.g., 220). This is a benefit over traditional fragment compression, where the Sample to Fragment Mapping bits need to be read to discover that the pixel is covered by a single fragment color.

At block 308, if the CG system determines that fragment operation is opaque, but the new fragment does not fully cover the pixel, it then checks whether the Mode Tracker is set to the maximum allowed number of fragments (i.e., "max-frag"). If so, the process proceeds to block 314. This max-frag value is set in a configuration and is determined by the minimum of the number of fragments that can be specified in the Mode Tracker and the maximum number of fragments that can be stored in the Fragment Color Set (e.g., 230) along with the necessary sample-to-fragment mapping data. For this example, the maximum number of fragments is three.

At block 314, the CG system reads mapping. It also writes new mapping and new fragment color. As part of this block, the CG system reads the Fragment to Sample Mapping, then writes the new fragment color to the first unused fragment slot in the fragment color set. There is guaranteed to be an unused slot since the Mode Tracker isn't set to max-frag. The new sample-to-fragment mapping is then written out based on the samples covered by the new fragment and the slot the new fragment color was written to. Block 350 then writes the new Mode Tracker with the new number of fragments. This case requires equivalent memory bandwidth as traditional fragment compression but still has an advantage in memory footprint Thus, at block 314, the system writes the color of the new fragment in a manner that indicates that that this color of this new fragment covers some of the samples of the pixel. For example, the CG system may write "color A" into the fragment two slot (236) of fragment color set 230 and writes the new sample-to-fragment mapping into fragment slot 3 (220). Then, at block 350, the CG system updates the fragment-coverage metadata (e.g., mode tracker 240) accordingly. For example, it may write a binary value of "11" to indicate three fragments cover the samples of the pixel 205. At this point, process 300 is done for this new fragment.

If block 308 determines that the fragment operation is non-opaque, or else the new fragment does not cover all of the samples and the pixel's Mapping Mode is the maximum allowed a number of fragments, then block 316 is performed. This block reads all of the pixels' fragment colors and the Sample to Fragment Mapping data and computes the new fragment colors and coverages. That is, at block 316, the CG system reads the existing (i.e., "old") colors and mapping data. For example, the CG system reads all of the data of the fragment color set 230, including the sample-to-fragment map 220.

After reading all of the data from the pixel being rendered, block 314 then performs a specified rendering operation, such as blend mode when the fragment coverage information is used to combine the new fragment color the covered sample colors. This will have the same result as if the pixel is converted to a single color per sample and then rendered as for normal supersampling, after which the samples with the same final color are gathered into fragments. Other implementations of the technology described herein may use other known approaches to perform this step on the fragment data that is stored in the pixel without first converting the pixel to a color per sample. Then, the process 300 proceeds to block 320, which represents a continuation of the process 300 as depicted in FIG. 3B.

FIG. 3B depicts a portion of process 300 handles the general case of fragment color processing. The logic of this portion combines the new fragment color with the color per fragment or sample of the current pixel and determines the number of unique colors required to represent the result. The number of unique colors may be any number from 1 to the total number of samples stored in the pixel.

This portion of process 300 may be triggered block 316 when the state of the new fragment is neither fully covering the samples nor opaque, and/or the pixel is not at max-frag state. Also, this portion of process 300 may be triggered from 332 when the state of the new fragment is either not opaque or partially covering.

At block 322, the CG system compares the number of fragment colors generated in block 316 (i.e., "resulting fragment colors") to the maximum allowed number of fragment colors (i.e., "max-frag-colors"). The max-frag-colors may be designated by a configuration setting but cannot be larger than the maximum number of fragment colors that can be specified for a given combination of the bits per Mode Tracker value and the bits per pixel. If the number of resulting fragment colors exceeds the max-frag-colors value, then block 326 is performed. Otherwise, the actions of block 324 are performed.

At block 326, the CG system uses the fragment colors and masks resulting from block 316 to write out a separate color per sample and sets the Mode Tracker to sample-mode for this pixel. Then, at block 350, the CG system updates the fragment-coverage metadata (e.g., mode tracker 240) accordingly. At this point, process 300 is done for this new fragment.

At block 324, the CG system writes out the resulting fragment colors to the pixel along with Sample to Fragment mapping data, and sets the Mapping Mode to a fragment mode for the number of fragment colors written to the pixel. If the pixel is currently in fragment mode and some of the colors were not changed, they may not need to be written back to the pixel. Then, at block 350, the CG system updates the fragment-coverage metadata (e.g., mode tracker 240) accordingly.

FIG. 3C depicts a portion of process 300 that occurs when the current Mode Tracker of the pixel specifies that it is stored in sample mode. This may occur, for example, when the value of mode Tracker 240 has a binary value of 00.

At block 330, the CG system tests the state of the new fragment (based on the information obtained with block 304). The possible states include "not opaque," "opaque; partially covered," or "opaque; fully covered." That is, the CG system determines whether the fragment operation is opaque and whether the new fragment fully covers the pixel.

If the state is "opaque; fully covered," then the process proceeds to block 334. That is, if the CG system determines that the new fragment fully covers the pixel and the fragment operation is opaque, then it performs the actions of block 334. In this situation, there is now only one fragment, which is the new one, covering all of the samples of the pixel.

At block 334, the CG system writes the color of the new fragment of the pixel, and it sets the mapping mode to indicate one fragment coverage (e.g., 1-fragment mode). For example, the system writes color X in F0 slot 232. If an internal copy of the sample-to-fragment mapping is stored, it is set to specify that all samples use fragment F0 (slot 232), but this value does not need to be written to memory. Then, at block 350, the CG system updates the fragment-coverage metadata (e.g., mode tracker 240) accordingly. For example, it writes a binary value of "01" to indicate one fragment covers all of the samples of the pixel 205. At this point, process 300 is done for this new fragment.

With conventional approaches, the entire sample-to-fragment map of a pixel must be read and then written in this situation, as well as writing the new fragment color. But with this new approach in this situation, the CG system only needs to write the one fragment color entry (e.g., slot 232) and the Mode Tracker (e.g., 240). This can significantly reduce the memory bandwidth required in this common situation of writing an opaque fragment that fully covers a pixel.

If the state of the new fragment is "not opaque" or "opaque; partial coverage," then the process proceeds to block 332, and the CG system reads the covered samples and then computes updated fragment colors and their coverages according to the new fragment coverage and a specified blend operation. That is, if the CG system determines that the new fragment either only partially covers the pixel or that the fragment operation is non-opaque, then the system reads (at block 332) the sample color data stored in the pixel.

The system then uses the fragment color and coverage being rendered to modify the color at each sample and produces a set of fragments, each of which specifies a sample color and a sample to fragment mapping that selects that fragment for its sample. If some of the samples store the same color, e.g. in the opaque partial coverage case, then this step may combine those samples into a single fragment. Then, the process 300 proceeds to block 320, which represents a continuation of the process 300 as depicted in FIG. 3B.

Optimization of Bandwidth-Efficient Lossless Fragment Color Compression of Multi-Sample Pixels In some implementations, the set of fragment colors (e.g., as referenced in block 322) may be produced by comparing the resulting colors and combining duplicates so that all fragment colors are unique. In the opaque mode, the number of fragment colors may be found by the simpler process of adding one to the number of pixel fragment or sample colors that are still visible after combining the new fragment, this potentially including duplicates. In the non-opaque mode, new unique colors may be found by intersecting each pixel fragment region with the coverage of the new fragment, and adding one to the number of unique colors for each non-empty intersection. Both of these methods may result in some duplicates among the fragment colors, but typically that is likely to be rare.

In some implementations, for 2-bit and larger metadata sizes, one of the metadata codes could be reserved to indicate that the pixel is entirely covered by a clear color. Alternately, the same optimization and more can be accomplished by combining this fragment compression scheme with block based lossless compression.

In some implementations, for single-sample pixels, block based lossless compression uses a separate set of metadata bits to specify whether a given block of bytes can be compressed, and if so by what method and how much. For example, a simple block-based compression scheme may compress two cache lines into one, leave the data uncompressed, or specify that the data is all equal to a defined clear color.

Block based compression can be combined with this method for fragment compression by using the MSAA metadata to indicate to the lossless compression algorithm how much data in the block is valid and how much can be ignored. For example, if a compression block contains all N color slots for a set of pixels, and all of them store a single fragment, those fragment values could be compressed on top of the up to N:1 compression obtained from encoding the pixel using fewer than N fragment colors. With 4×MSAA and 2:1 lossless compression, this could produce up to 8:1 compression. If the fragment color for all of the pixels is the clear color, then the lossless compression algorithm could detect and specify that.

Another way to achieve this is to store the data so that each block contains color slot N for each a set of pixels. Then if there is 4×MSAA and all of the pixels use one fragment, three of the blocks are ignored, and the remaining block with fragment data can be compressed in the usual way, including detecting that all of the pixels use the clear color. This method is also efficient for cases where pixels use different numbers of fragments, in particular if the lossless compression approach knows which bits are unused and so are don't care for compression. Also, this method groups the mapping data together into separate blocks from the fragment colors. This could be beneficial since the mapping data might be compressed better using a different compression algorithm than is used for the color data.

System Overview

Figure 4:
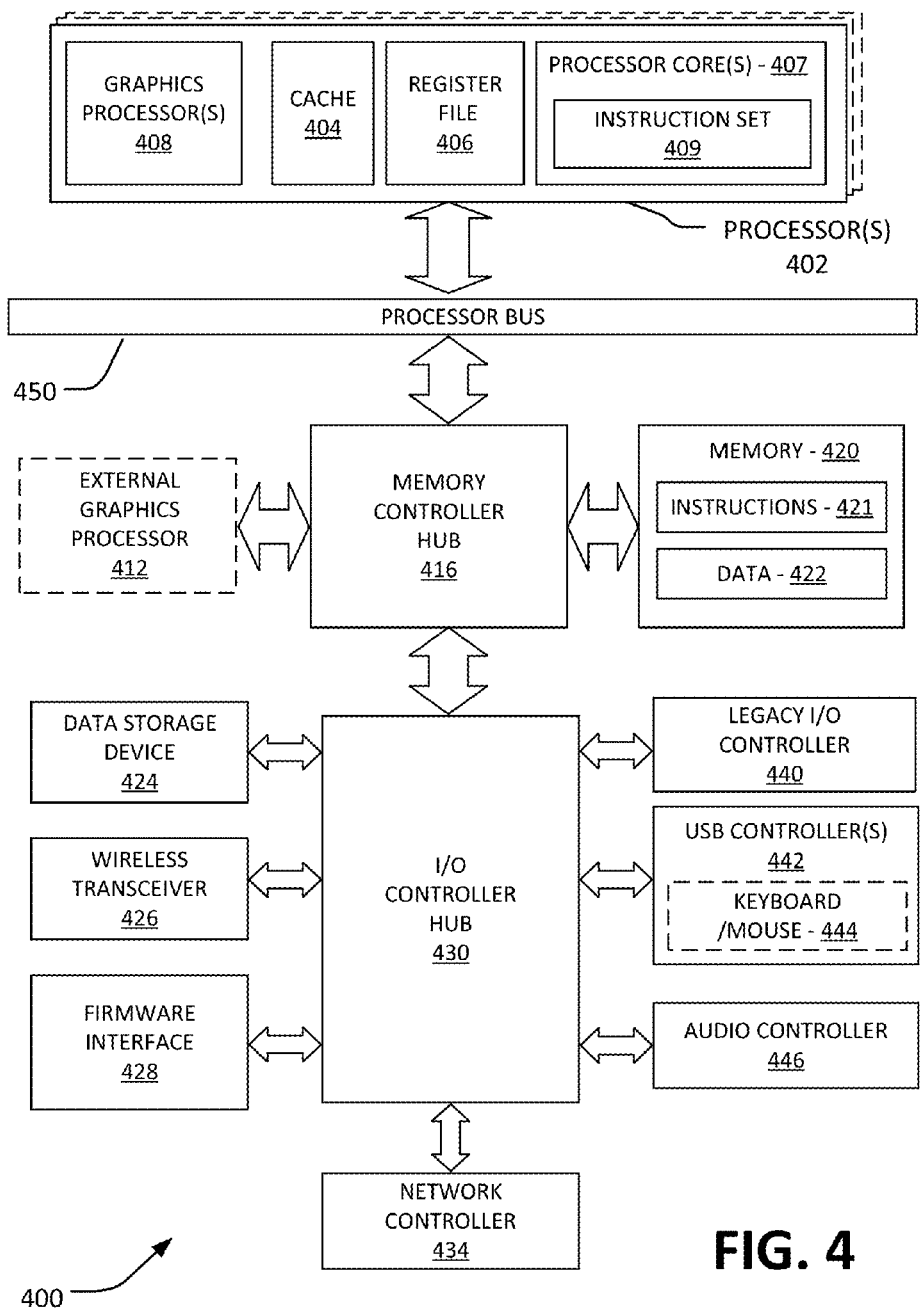
FIG. 4 is a block diagram of a data processing system according to an embodiment.

FIG. 4 is a block diagram of a processing system 400, according to an embodiment. In various embodiments the system 400 includes one or more processors 402 and one or more graphics processors 408, and may be a single processor desktop system, a multiprocessor workstation system, or a server system having a large number of processors 402 or processor cores 407. In one embodiment, the system 400 is a processing platform incorporated within a system-on-a-chip (SoC) integrated circuit for use in mobile, handheld, or embedded devices.

An embodiment of system 400 can include, or be incorporated within a server-based gaming platform, a game console, including a game and media console, a mobile gaming console, a handheld game console, or an online game console. In some embodiments system 400 is a mobile phone, smart phone, tablet computing device or mobile Internet device. Data processing system 400 can also include, couple with, or be integrated within a wearable device, such as a smart watch wearable device, smart eyewear device, augmented reality device, or virtual reality device. In some embodiments, data processing system 400 is a television or set top box device having one or more processors 402 and a graphical interface generated by one or more graphics processors 408.

In some embodiments, the one or more processors 402 each include one or more processor cores 407 to process instructions which, when executed, perform operations for system and user software. In some embodiments, each of the one or more processor cores 407 is configured to process a specific instruction set 409. In some embodiments, instruction set 409 may facilitate Complex Instruction Set Computing (CISC), Reduced Instruction Set Computing (RISC), or computing via a Very Long Instruction Word (VLIW). Multiple processor cores 407 may each process a different instruction set 409, which may include instructions to facilitate the emulation of other instruction sets. Processor core 407 may also include other processing devices, such a Digital Signal Processor (DSP).

In some embodiments, the processor 402 includes cache memory 404. Depending on the architecture, the processor 402 can have a single internal cache or multiple levels of internal cache. In some embodiments, the cache memory is shared among various components of the processor 402. In some embodiments, the processor 402 also uses an external cache (e.g., a Level-3 (L3) cache or Last Level Cache (LLC)) (not shown), which may be shared among processor cores 407 using known cache coherency techniques. A register file 406 is additionally included in processor 402 which may include different types of registers for storing different types of data (e.g., integer registers, floating point registers, status registers, and an instruction pointer register). Some registers may be general-purpose registers, while other registers may be specific to the design of the processor 402.

In some embodiments, processor 402 is coupled with a processor bus 410 to transmit communication signals such as address, data, or control signals between processor 402 and other components in system 400. In one embodiment the system 400 uses an exemplary 'hub' system architecture, including a memory controller hub 416 and an Input Output (I/O) controller hub 430. A memory controller hub 416 facilitates communication between a memory device and other components of system 400, while an I/O Controller Hub (ICH) 430 provides connections to I/O devices via a local I/O bus. In one embodiment, the logic of the memory controller hub 416 is integrated within the processor.

Memory device 420 can be a dynamic random access memory (DRAM) device, a static random access memory (SRAM) device, flash memory device, phase-change memory device, or some other memory device having suitable performance to serve as process memory. In one embodiment the memory device 420 can operate as system memory for the system 400, to store data 422 and instructions 421 for use when the one or more processors 402 executes an application or process. Memory controller hub 416 also couples with an optional external graphics processor 412, which may communicate with the one or more graphics processors 408 in processors 402 to perform graphics and media operations.

In some embodiments, ICH 430 enables peripherals to connect to memory device 420 and processor 402 via a high-speed I/O bus. The I/O peripherals include, but are not limited to, an audio controller 446, a firmware interface 428, a wireless transceiver 426 (e.g., Wi-Fi, Bluetooth), a data storage device 424 (e.g., hard disk drive, flash memory, etc.), and a legacy I/O controller 440 for coupling legacy (e.g., Personal System 2 (PS/2)) devices to the system. One or more Universal Serial Bus (USB) controllers 442 connect input devices, such as keyboard and mouse 444 combinations. A network controller 434 may also couple to ICH 430. In some embodiments, a high-performance network controller (not shown) couples with processor bus 410. It will be appreciated that the system 400 shown is exemplary and not limiting, as other types of data processing systems that are differently configured may also be used. For example, the I/O controller hub 430 may be integrated within the one or more processor 402, or the memory controller hub 416 and I/O controller hub 430 may be integrated into a discreet external graphics processor, such as the external graphics processor 412.

Figure 5:
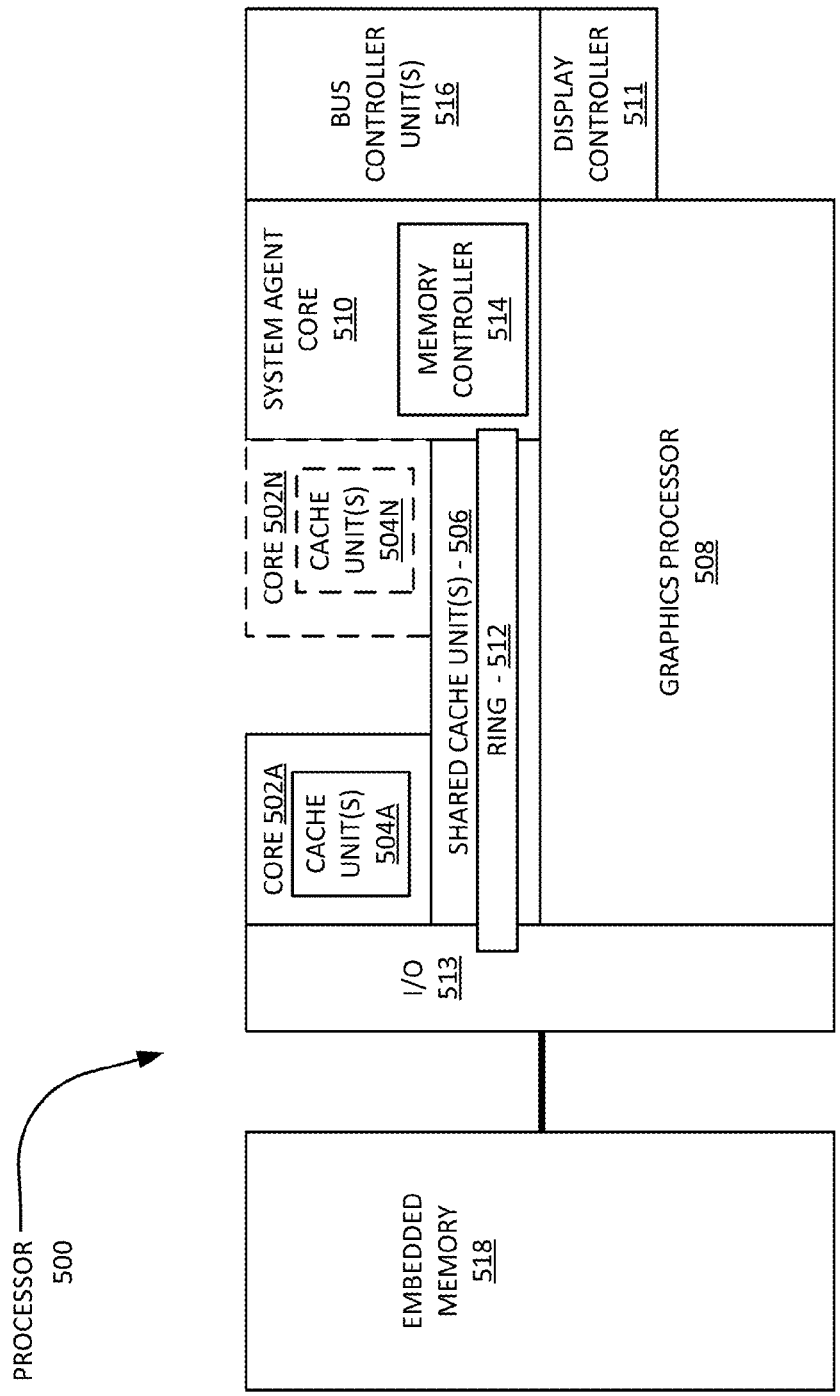
FIG. 5 is a block diagram of an embodiment of a processor having one or more processor cores, an integrated memory controller, and an integrated graphics processor.

FIG. 5 is a block diagram of an embodiment of a processor 500 having one or more processor cores 502A-502N, an integrated memory controller 514, and an integrated graphics processor 508. Those elements of FIG. 5 having the same reference numbers (or names) as the elements of any other figure herein can operate or function in any manner similar to that described elsewhere herein, but are not limited to such. Processor 500 can include additional cores up to and including additional core 502N represented by the dashed lined boxes. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 506 and 504A-504N.

In some embodiments, processor 500 may also include a set of one or more bus controller units 516 and a system agent core 510. The one or more bus controller units 516 manage a set of peripheral buses, such as one or more Peripheral Component Interconnect buses (e.g., PCI, PCI Express). System agent core 510 provides management functionality for the various processor components. In some embodiments, system agent core 510 includes one or more integrated memory controllers 514 to manage access to various external memory devices (not shown).

In some embodiments, one or more of the processor cores 502A-502N include support for simultaneous multi-threading. In such embodiment, the system agent core 510 includes components for coordinating and operating cores 502A-502N during multi-threaded processing. System agent core 510 may additionally include a power control unit (PCU), which includes logic and components to regulate the power state of processor cores 502A-502N and graphics processor 508.

In some embodiments, processor 500 additionally includes graphics processor 508 to execute graphics processing operations. In some embodiments, the graphics processor 508 couples with the set of shared cache units 506, and the system agent core 510, including the one or more integrated memory controllers 514. In some embodiments, a display controller 511 is coupled with the graphics processor 508 to drive graphics processor output to one or more coupled displays. In some embodiments, display controller 511 may be a separate module coupled with the graphics processor via at least one interconnect, or may be integrated within the graphics processor 508 or system agent core 510.

In some embodiments, a ring based interconnect unit 512 is used to couple the internal components of the processor

500. However, an alternative interconnect unit may be used, such as a point-to-point interconnect, a switched interconnect, or other techniques, including techniques well known in the art. In some embodiments, graphics processor 508 couples with the ring interconnect 512 via an I/O link 513.

The exemplary I/O link 513 represents at least one of multiple varieties of I/O interconnects, including an on package I/O interconnect which facilitates communication between various processor components and a high-performance embedded memory module 518, such as an eDRAM module. In some embodiments, each of the processor cores 502A-502N and graphics processor 508 use embedded memory modules 518 as a shared Last Level Cache.

In some embodiments, processor cores 502A-502N are homogenous cores executing the same instruction set architecture. In another embodiment, processor cores 502A-502N are heterogeneous in terms of instruction set architecture (ISA), where one or more of processor cores 502A-N execute a first instruction set, while at least one of the other cores executes a subset of the first instruction set or a different instruction set. In one embodiment processor cores 502A-502N are heterogeneous in terms of microarchitecture, where one or more cores having a relatively higher power consumption couple with one or more power cores having a lower power consumption. Additionally, processor 500 can be implemented on one or more chips or as an SoC integrated circuit having the illustrated components, in addition to other components.

Figure 6:
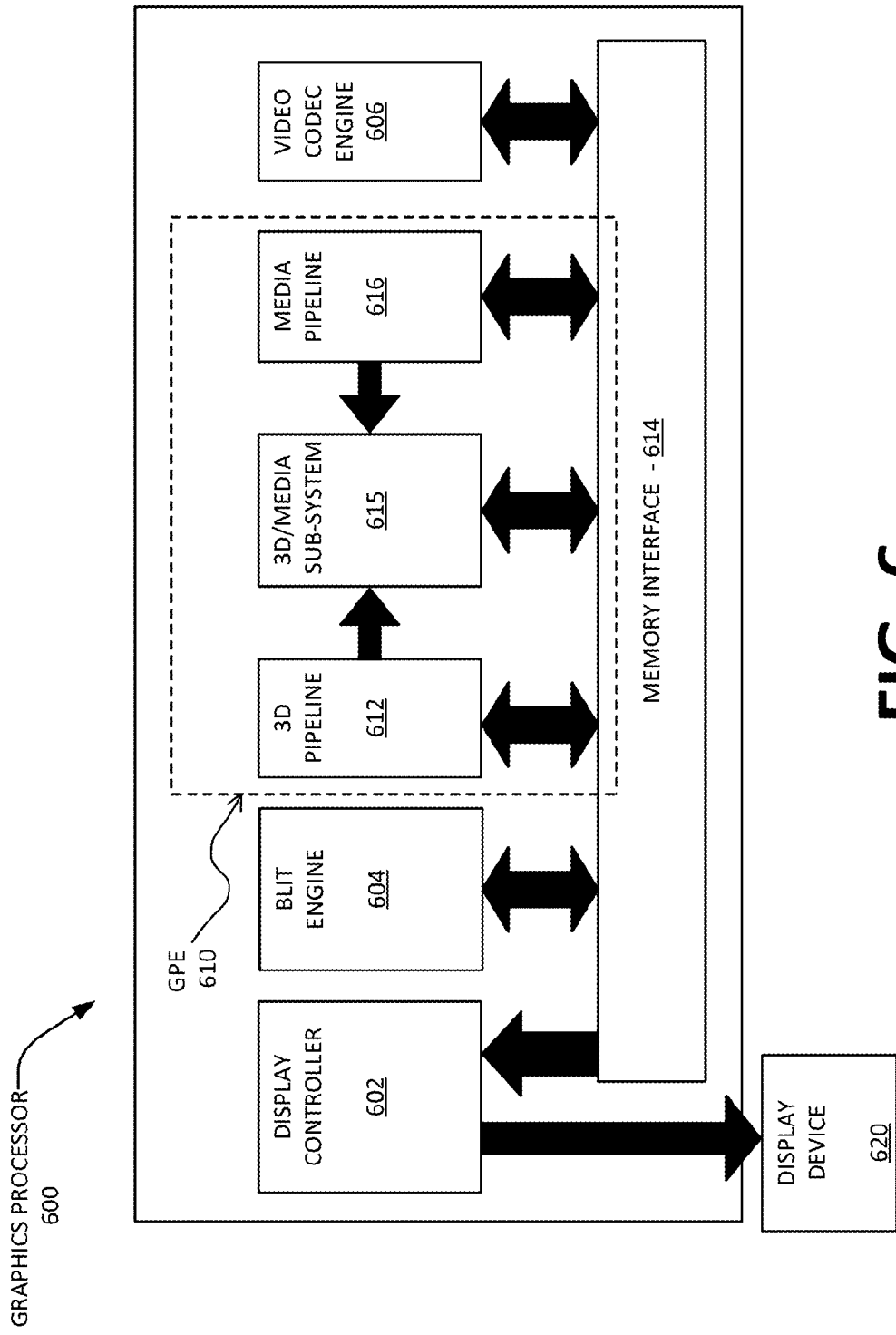
FIG. 6 is a block diagram of one embodiment of a graphics processor which may be a discrete graphics processing unit, or may be graphics processor integrated with a plurality of processing cores.

FIG. 6 is a block diagram of a graphics processor 600, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 600 includes a memory interface 614 to access memory. Memory interface 614 can be an interface to local memory, one or more internal caches, one or more shared external caches, and/or to system memory.

In some embodiments, graphics processor 600 also includes a display controller 602 to drive display output data to a display device 620. Display controller 602 includes hardware for one or more overlay planes for the display and composition of multiple layers of video or user interface elements. In some embodiments, graphics processor 600 includes a video codec engine 606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 600 includes a block image transfer (BLIT) engine 604 to perform two-dimensional (2D) rasterizer operations including, for example, bit-boundary block transfers. However, in one embodiment, 2D graphics operations are performed using one or more components of graphics processing engine (GPE) 610. In some embodiments, GPE 610 is a compute engine for performing graphics operations, including three-dimensional (3D) graphics operations and media operations.

In some embodiments, GPE 610 includes a 3D pipeline 612 for performing 3D operations, such as rendering three-dimensional images and scenes using processing functions that act upon 3D primitive shapes (e.g., rectangle, triangle, etc.). The 3D pipeline 612 includes programmable and fixed function elements that perform various tasks within the element and/or spawn execution threads to a 3D/Media sub-system 615. While 3D pipeline 612 can be used to perform media operations, an embodiment of GPE 610 also includes a media pipeline 616 that is specifically used to perform media operations, such as video post-processing and image enhancement.

In some embodiments, media pipeline 616 includes fixed function or programmable logic units to perform one or more specialized media operations, such as video decode acceleration, video de-interlacing, and video encode acceleration in place of, or on behalf of video codec engine 606. In some embodiments, media pipeline 616 additionally includes a thread spawning unit to spawn threads for execution on 3D/Media sub-system 615. The spawned threads perform computations for the media operations on one or more graphics execution units included in 3D/Media sub-system 615.

In some embodiments, 3D/Media subsystem 615 includes logic for executing threads spawned by 3D pipeline 612 and media pipeline 616. In one embodiment, the pipelines send thread execution requests to 3D/Media subsystem 615, which includes thread dispatch logic for arbitrating and dispatching the various requests to available thread execution resources. The execution resources include an array of graphics execution units to process the 3D and media threads. In some embodiments, 3D/Media subsystem 615 includes one or more internal caches for thread instructions and data. In some embodiments, the subsystem also includes shared memory, including registers and addressable memory, to share data between threads and to store output data.

Graphics Processing Engine

Figure 7:
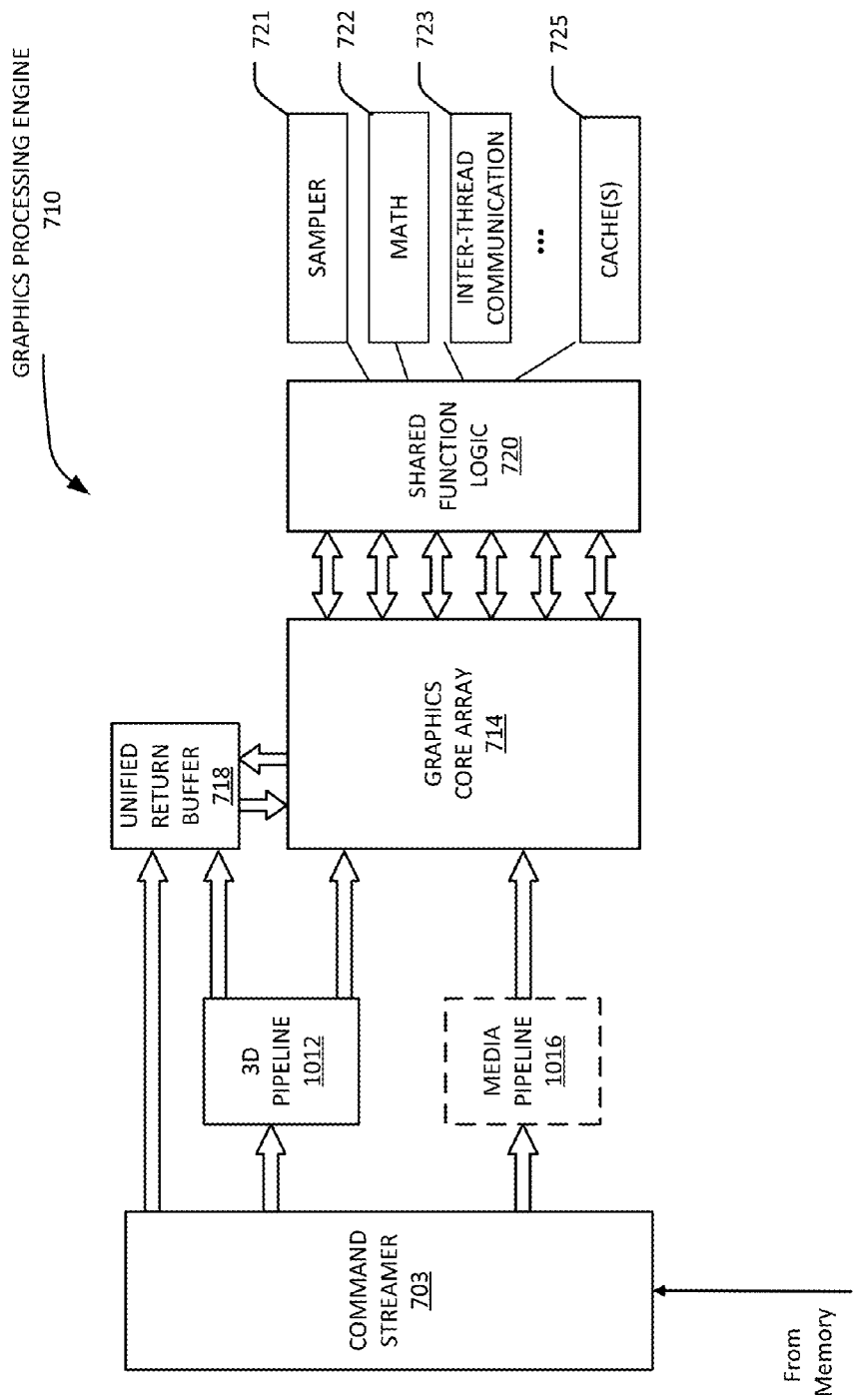
FIG. 7 is a block diagram of an embodiment of a graphics processing engine for a graphics processor.

FIG. 7 is a block diagram of a graphics processing engine 710 of a graphics processor in accordance with some embodiments. In one embodiment, the graphics processing engine (GPE) 710 is a version of the GPE 610 shown in FIG. 6. Elements of FIG. 7 having the same reference numbers (or names) as the elements of any other figure herein can operate or function in any manner similar to that described elsewhere herein, but are not limited to such. For example, the 3D pipeline 612 and media pipeline 616 of FIG. 6 are illustrated. The media pipeline 616 is optional in some embodiments of the GPE 710 and may not be explicitly included within the GPE 710. For example and in at least one embodiment, a separate media and/or image processor is coupled to the GPE 710.

In some embodiments, GPE 710 couples with or includes a command streamer 703, which provides a command stream to the 3D pipeline 612 and/or media pipelines 616. In some embodiments, command streamer 703 is coupled with memory, which can be system memory, or one or more of internal cache memory and shared cache memory. In some embodiments, command streamer 703 receives commands from the memory and sends the commands to 3D pipeline 612 and/or media pipeline 616. The commands are directives fetched from a ring buffer, which stores commands for the 3D pipeline 612 and media pipeline 616. In one embodiment, the ring buffer can additionally include batch command buffers storing batches of multiple commands. The commands for the 3D pipeline 612 can also include references to data stored in memory, such as but not limited to vertex and geometry data for the 3D pipeline 612 and/or image data and memory objects for the media pipeline 616. The 3D pipeline 612 and media pipeline 616 process the commands and data by performing operations via logic within the respective pipelines or by dispatching one or more execution threads to a graphics core array 714.

In various embodiments the 3D pipeline 612 can execute one or more shader programs, such as vertex shaders, geometry shaders, pixel shaders, fragment shaders, compute shaders, or other shader programs, by processing the instructions and dispatching execution threads to the graphics core array 714. The graphics core array 714 provides a unified block of execution resources. Multi-purpose execution logic (e.g., execution units) within the graphic core array 714 includes support for various 3D API shader languages and can execute multiple simultaneous execution threads associated with multiple shaders.

In some embodiments the graphics core array 714 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 407 of FIG. 4 or core 502A-502N as in FIG. 5.

Output data generated by threads executing on the graphics core array 714 can output data to memory in a unified return buffer (URB) 718. The URB 718 can store data for multiple threads. In some embodiments the URB 718 may be used to send data between different threads executing on the graphics core array 714. In some embodiments the URB 718 may additionally be used for synchronization between threads on the graphics core array and fixed function logic within the shared function logic 720.

In some embodiments, graphics core array 714 is scalable, such that the array includes a variable number of graphics cores, each having a variable number of execution units based on the target power and performance level of GPE 710. In one embodiment the execution resources are dynamically scalable, such that execution resources may be enabled or disabled as needed.

The graphics core array 714 couples with shared function logic 720 that includes multiple resources that are shared between the graphics cores in the graphics core array. The shared functions within the shared function logic 720 are hardware logic units that provide specialized supplemental functionality to the graphics core array 714. In various embodiments, shared function logic 720 includes but is not limited to sampler 721, math 722, and inter-thread communication (ITC) 723 logic. Additionally, some embodiments implement one or more cache(s) 725 within the shared function logic 720. A shared function is implemented where the demand for a given specialized function is insufficient for inclusion within the graphics core array 714. Instead a single instantiation of that specialized function is implemented as a stand-alone entity in the shared function logic 720 and shared among the execution resources within the graphics core array 714. The precise set of functions that are shared between the graphics core array 714 and included within the graphics core array 714 varies between embodiments.

Figure 8:
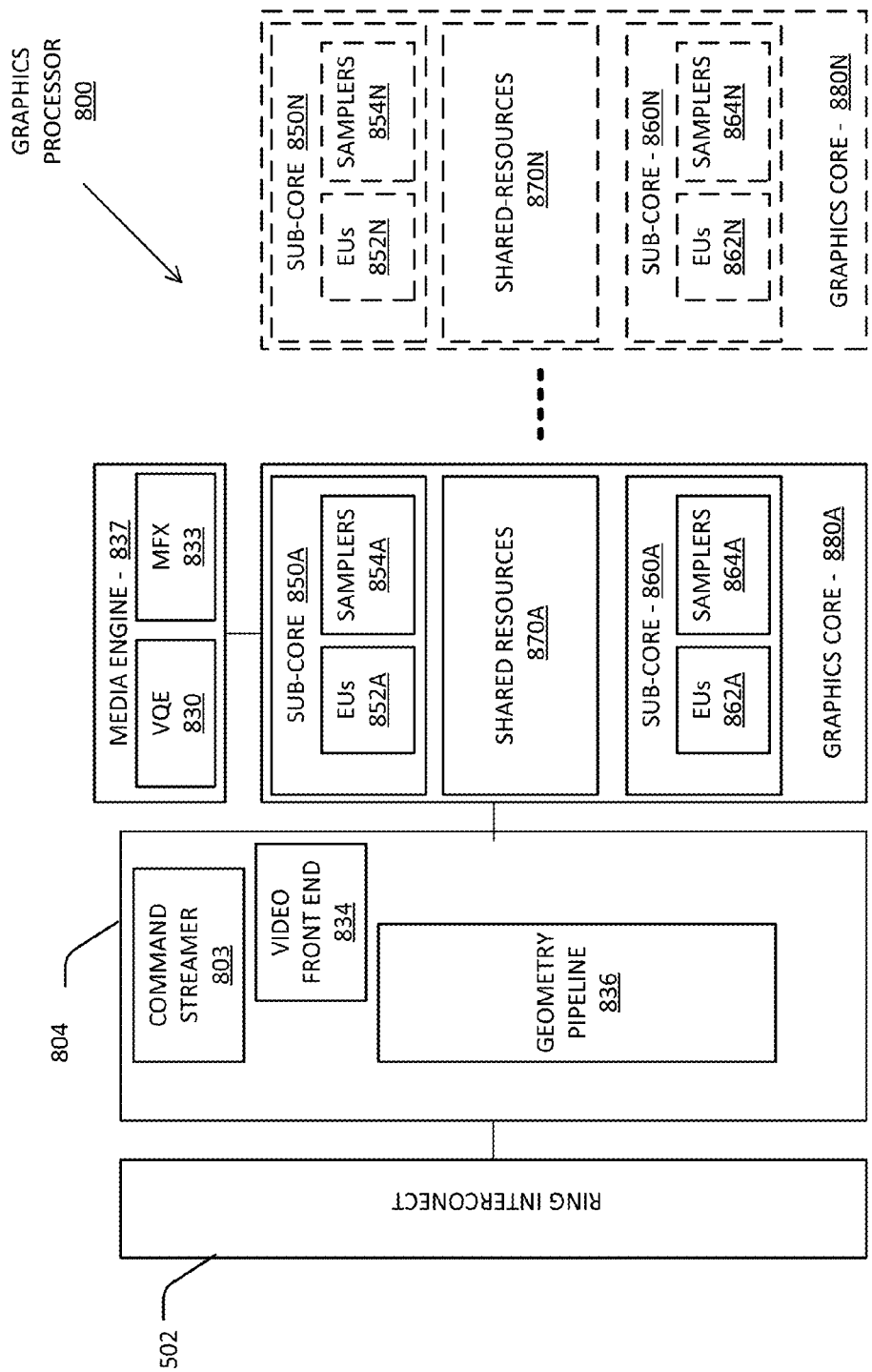
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a ring interconnect 802, a pipeline front-end 804, a media engine 837, and graphics cores 880A-880N. In some embodiments, ring interconnect 802 couples the graphics processor to other processing units, including other graphics processors or one or more general-purpose processor cores. In some embodiments, the graphics processor is one of many processors integrated within a multi-core processing system.

In some embodiments, graphics processor 800 receives batches of commands via ring interconnect 802. The incoming commands are interpreted by a command streamer 803 in the pipeline front-end 804. In some embodiments, graphics processor 800 includes scalable execution logic to perform 3D geometry processing and media processing via the graphics core(s) 880A-880N. For 3D geometry processing commands, command streamer 803 supplies commands to geometry pipeline 836. For at least some media processing commands, command streamer 803 supplies the commands to a video front end 834, which couples with a media engine 837. In some embodiments, media engine 837 includes a Video Quality Engine (VQE) 830 for video and image post-processing and a multi-format encode/decode (MFX) 833 engine to provide hardware-accelerated media data encode and decode. In some embodiments, geometry pipeline 836 and media engine 837 each generate execution threads for the thread execution resources provided by at least one graphics core 880A.

In some embodiments, graphics processor 800 includes scalable thread execution resources featuring modular cores 880A-880N (sometimes referred to as core slices), each having multiple sub-cores 850A-850N, 860A-860N (sometimes referred to as core sub-slices). In some embodiments, graphics processor 800 can have any number of graphics cores 880A through 880N. In some embodiments, graphics processor 800 includes a graphics core 880A having at least a first sub-core 850A and a second sub-core 860A. In other embodiments, the graphics processor is a low power processor with a single sub-core (e.g., 850A). In some embodiments, graphics processor 800 includes multiple graphics cores 880A-880N, each including a set of first sub-cores 850A-850N and a set of second sub-cores 860A-860N. Each sub-core in the set of first sub-cores 850A-850N includes at least a first set of execution units 852A-852N and media/texture samplers 854A-854N. Each sub-core in the set of second sub-cores 860A-860N includes at least a second set of execution units 862A-862N and samplers 864A-864N. In some embodiments, each sub-core 850A-850N, 860A-860N shares a set of shared resources 870A-870N. In some embodiments, the shared resources include shared cache memory and pixel operation logic. Other shared resources may also be included in the various embodiments of the graphics processor.

Execution Units

Figure 9:
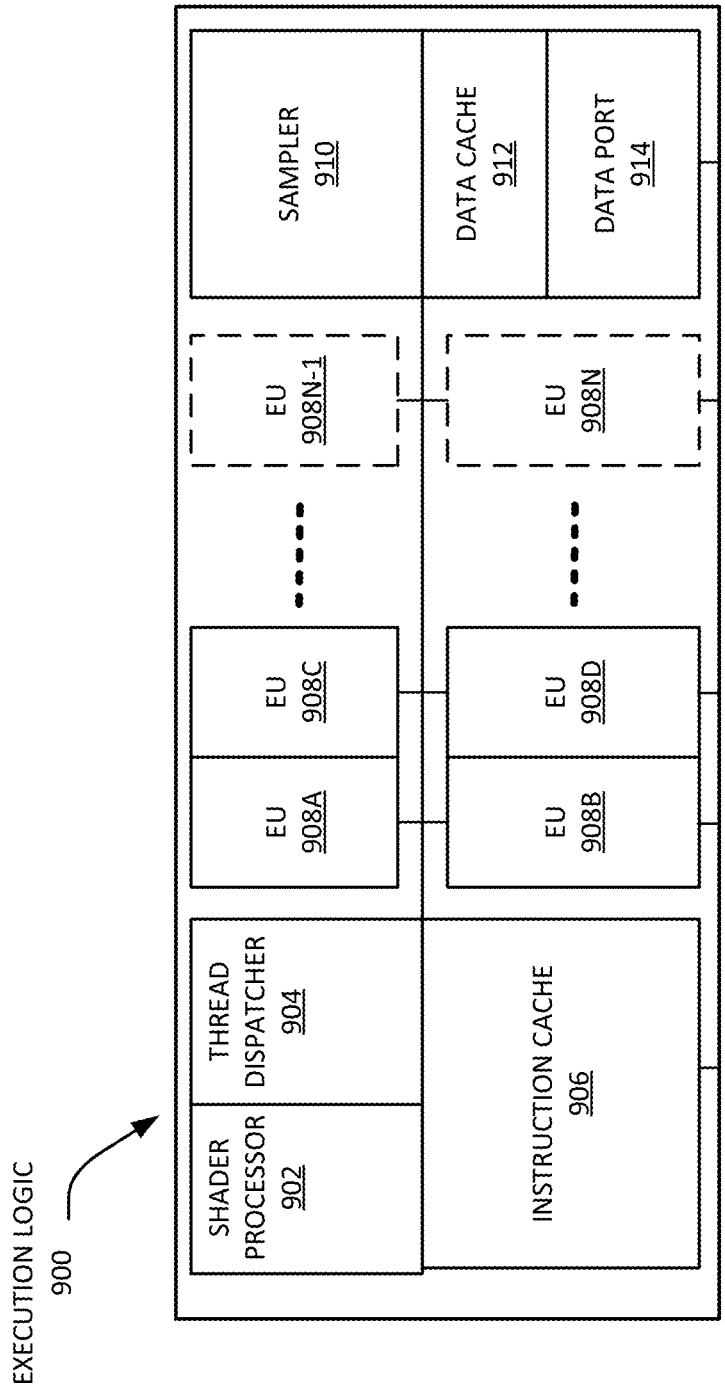
FIG. 9 illustrates thread execution logic including an array of processing elements employed in one embodiment of a graphics processing engine.

FIG. 9 illustrates thread execution logic 900 including an array of processing elements employed in some embodiments of a GPE. Elements of FIG. 9 having the same reference numbers (or names) as the elements of any other figure herein can operate or function in any manner similar to that described elsewhere herein, but are not limited to such.

In some embodiments, thread execution logic 900 includes a shader processor 902, a thread dispatcher 904, instruction cache 906, a scalable execution unit array including a plurality of execution units 908A-908N, a sampler 910, a data cache 912, and a data port 914. In one embodiment the scalable execution unit array can dynamically scale by enabling or disabling one or more execution units (e.g., any of execution unit 908A, 908B, 908C, 908D, through 908N-1 and 908N) based on the computational requirements of a workload. In one embodiment the included components are interconnected via an interconnect fabric that links to each of the components. In some embodiments, thread execution logic 900 includes one or more connections to memory, such as system memory or cache memory, through one or more of instruction cache 906, data port 914, sampler 910, and execution units 908A-908N. In some embodiments, each execution unit (e.g. 908A) is a stand-alone programmable general purpose computational unit that is capable of executing multiple simultaneous hardware threads while processing multiple data elements in parallel for each thread. In various embodiments, the array of execution units 908A-908N is scalable to include any number individual execution units.

In some embodiments, the execution units 908A-608N are primarily used to execute shader programs. A shader processor 902 can process the various shader programs and dispatch execution threads associated with the shader programs via a thread dispatcher 904. In one embodiment the thread dispatcher includes logic to arbitrate thread initiation requests from the graphics and media pipelines and instantiate the requested threads on one or more execution unit in the execution units 908A-908N. For example, the geometry pipeline (e.g., 836 of FIG. 8) can dispatch vertex, tessellation, or geometry shaders to the thread execution logic 900 (FIG. 9) for processing. In some embodiments, thread dispatcher 904 can also process runtime thread spawning requests from the executing shader programs.

In some embodiments, the execution units 908A-908N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 908A-908N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 908A-908N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 908A-908N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 908A-908N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 906) are included in the thread execution logic 900 to cache thread instructions for the execution units. In some embodiments, one or more data caches (e.g., 912) are included to cache thread data during thread execution. In some embodiments, a sampler 910 is included to provide texture sampling for 3D operations and media sampling for media operations. In some embodiments, sampler 910 includes specialized texture or media sampling functionality to process texture or media data during the sampling process before providing the sampled data to an execution unit.

During execution, the graphics and media pipelines send thread initiation requests to thread execution logic 900 via thread spawning and dispatch logic. Once a group of geometric objects has been processed and rasterized into pixel data, pixel processor logic (e.g., pixel shader logic, fragment shader logic, etc.) within the shader processor 902 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 902 then executes an application programming interface (API)-supplied pixel or fragment shader program. To execute the shader program, the shader processor 902 dispatches threads to an execution unit (e.g., 908A) via thread dispatcher 904. In some embodiments, pixel shader 902 uses texture sampling logic in the sampler 910 to access texture data in texture maps stored in memory. Arithmetic operations on the texture data and the input geometry data compute pixel color data for each geometric fragment, or discards one or more pixels from further processing.

In some embodiments, the data port 914 provides a memory access mechanism for the thread execution logic 900 output processed data to memory for processing on a graphics processor output pipeline. In some embodiments, the data port 914 includes or couples with one or more cache memories (e.g., data cache 912) to cache data for memory access via the data port.

Figure 10:
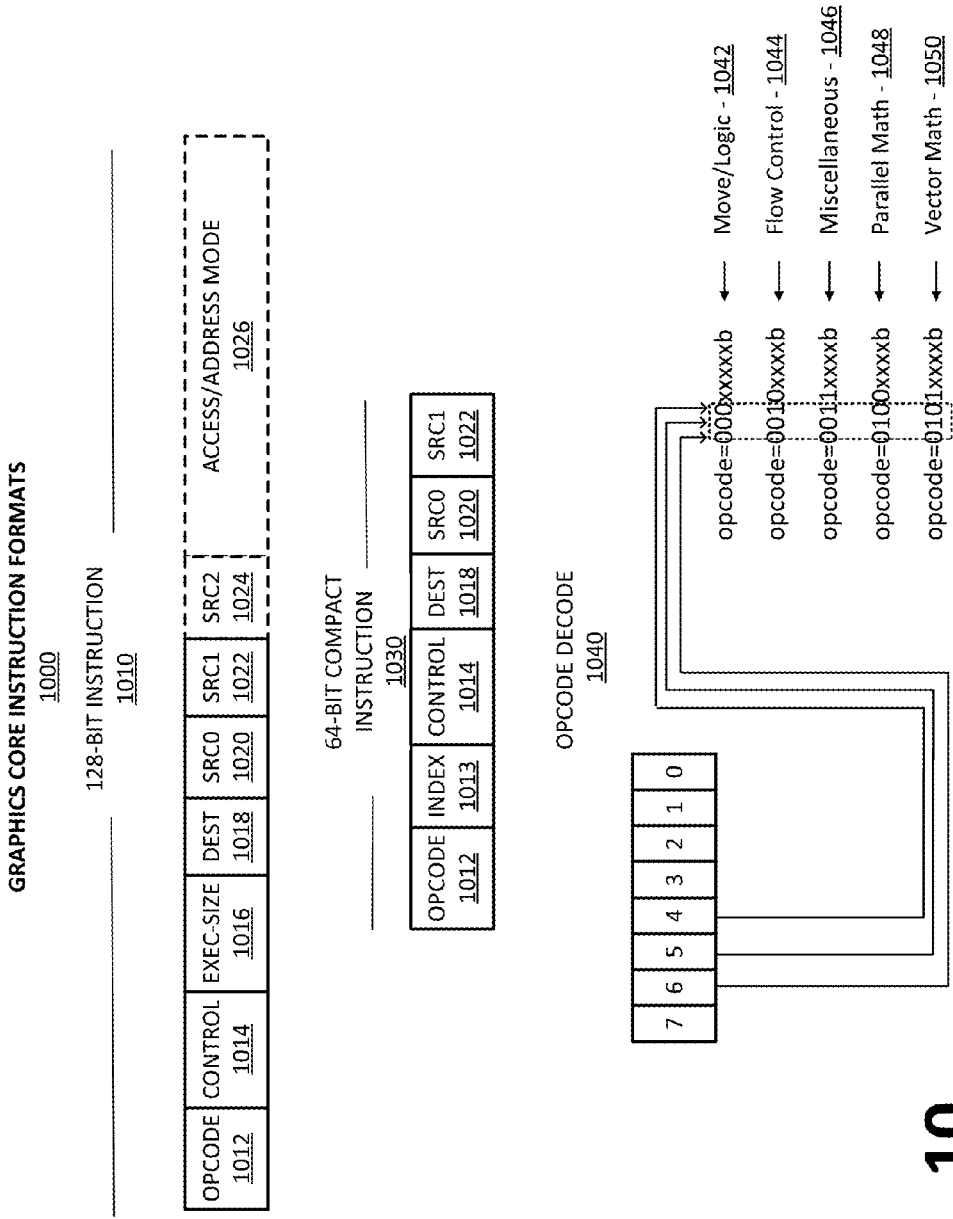
FIG. 10 is a block diagram illustrating a graphics processor execution unit instruction format according to an embodiment.

FIG. 10 is a block diagram illustrating a graphics processor instruction formats 1000 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1000 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 1010. A 64-bit compacted instruction format 1030 is available for some instructions based on the selected instruction, instruction options, and number of operands. The native 128-bit instruction format 1010 provides access to all instruction options, while some options and operations are restricted in the 64-bit format 1030. The native instructions available in the 64-bit format 1030 vary by embodiment. In some embodiments, the instruction is compacted in part using a set of index values in an index field 1013. The execution unit hardware references a set of compaction tables based on the index values and uses the compaction table outputs to reconstruct a native instruction in the 128-bit instruction format 1010.

For each format, instruction opcode 1012 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1014 enables control over certain execution options, such as channels selection (e.g., predication) and data channel order (e.g., swizzle). For instructions in the 128-bit instruction format 1010 an exec-size field 1016 limits the number of data channels that will be executed in parallel. In some embodiments, exec-size field 1016 is not available for use in the 64-bit compact instruction format 1030.

Some execution unit instructions have up to three operands including two source operands, src0 1020, src1 1022, and one destination 1018. In some embodiments, the execution units support dual destination instructions, where one of the destinations is implied. Data manipulation instructions can have a third source operand (e.g., SRC2 1024), where the instruction opcode 1012 determines the number of source operands. An instruction's last source operand can be an immediate (e.g., hard-coded) value passed with the instruction.

In some embodiments, the 128-bit instruction format 1010 includes an access/address mode field 1026 specifying, for example, whether direct register addressing mode or indirect register addressing mode is used. When direct register addressing mode is used, the register address of one or more operands is directly provided by bits in the instruction.

In some embodiments, the 128-bit instruction format 1010 includes an access/address mode field 1026, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 1026 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 1012 bit-fields to simplify Opcode decode 1040. For an 8-bit opcode, bits 4, 5, and 6 allow the execution unit to determine the type of opcode. The precise opcode grouping shown is merely an example. In some embodiments, a move and logic opcode group 1042 includes data movement and logic instructions (e.g., move (mov), compare (cmp)). In some embodiments, move and logic group 1042 shares the five most significant bits (MSB), where move (mov) instructions are in the form of 0000xxxxb and logic instructions are in the form of 0001xxxxb. A flow control instruction group 1044 (e.g., call, jump (jmp)) includes instructions in the form of 0010xxxxb (e.g., 0x20). A miscellaneous instruction group 1046 includes a mix of instructions, including synchronization instructions (e.g., wait, send) in the form of 0011xxxxb (e.g., 0x30). A parallel math instruction group 1048 includes component-wise arithmetic instructions (e.g., add, multiply (mul)) in the form of 0100xxxxb (e.g., 0x40). The parallel math group 1048 performs the arithmetic operations in parallel across data channels. The vector math group 1050 includes arithmetic instructions (e.g., dp4) in the form of 0101xxxxb (e.g., 0x50). The vector math group performs arithmetic such as dot product calculations on vector operands.

Graphics Pipeline

Figure 11:
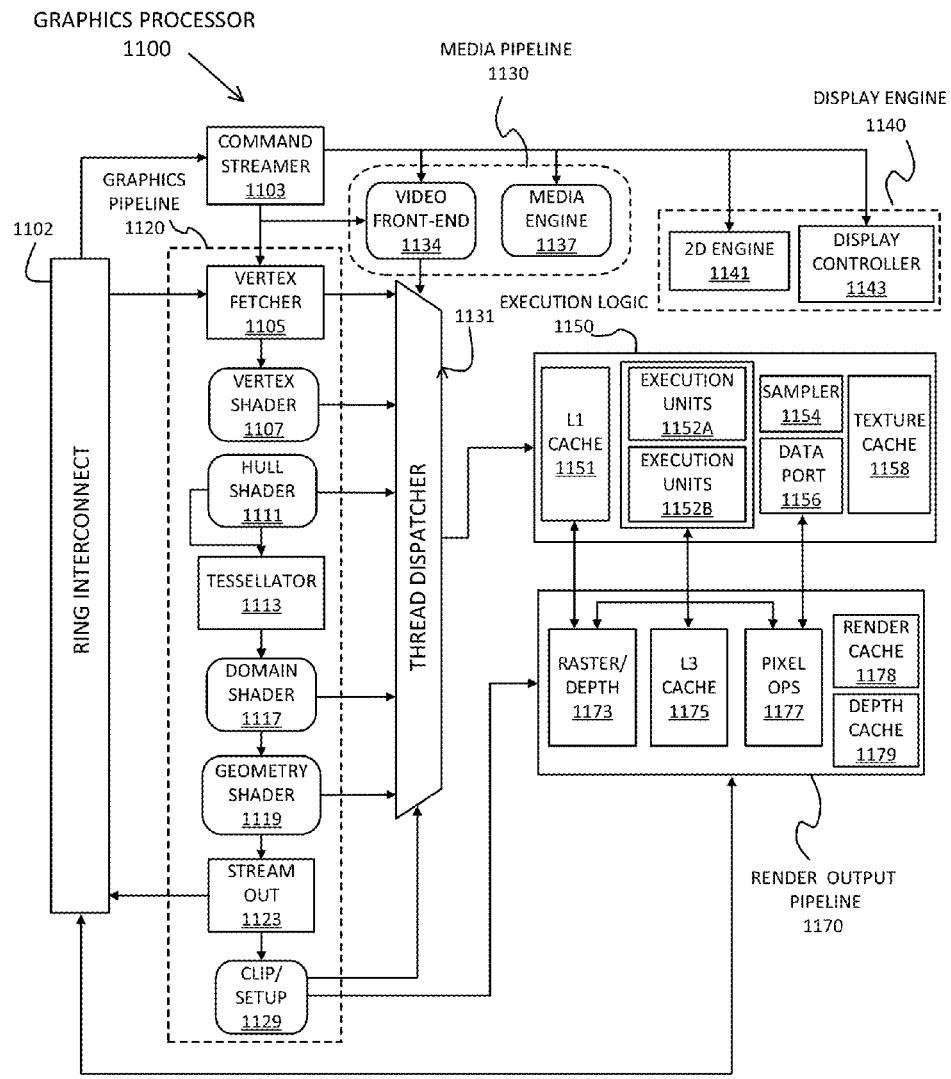
FIG. 11 is a block diagram of another embodiment of a graphics processor which includes a graphics pipeline, a media pipeline, a display engine, thread execution logic, and a render output pipeline.

FIG. 11 is a block diagram of another embodiment of a graphics processor 1100. Elements of FIG. 11 having the same reference numbers (or names) as the elements of any other figure herein can operate or function in any manner similar to that described elsewhere herein, but are not limited to such.

In some embodiments, graphics processor 1100 includes a graphics pipeline 1120, a media pipeline 1130, a display engine 1140, thread execution logic 1150, and a render output pipeline 1170. In some embodiments, graphics processor 1100 is a graphics processor within a multi-core processing system that includes one or more general purpose processing cores. The graphics processor is controlled by register writes to one or more control registers (not shown) or via commands issued to graphics processor 1100 via a ring interconnect 1102. In some embodiments, ring interconnect 1102 couples graphics processor 1100 to other processing components, such as other graphics processors or general-purpose processors. Commands from ring interconnect 1102 are interpreted by a command streamer 1103, which supplies instructions to individual components of graphics pipeline 1120 or media pipeline 1130.

In some embodiments, command streamer 1103 directs the operation of a vertex fetcher 1105 that reads vertex data from memory and executes vertex-processing commands provided by command streamer 1103. In some embodiments, vertex fetcher 1105 provides vertex data to a vertex shader 1107, which performs coordinate space transformation and lighting operations to each vertex. In some embodiments, vertex fetcher 1105 and vertex shader 1107 execute vertex-processing instructions by dispatching execution threads to execution units 1152A-1152B via a thread dispatcher 1131.

In some embodiments, execution units 1152A-1152B are an array of vector processors having an instruction set for performing graphics and media operations. In some embodiments, execution units 1152A, 1152B have an attached L1 cache 1151 that is specific for each array or shared between the arrays. The cache can be configured as a data cache, an instruction cache, or a single cache that is partitioned to contain data and instructions in different partitions.

In some embodiments, graphics pipeline 1120 includes tessellation components to perform hardware-accelerated tessellation of 3D objects. In some embodiments, a programmable hull shader 1111 configures the tessellation operations. A programmable domain shader 1117 provides back-end evaluation of tessellation output. A tessellator 1113 operates at the direction of hull shader 1111 and contains special purpose logic to generate a set of detailed geometric objects based on a coarse geometric model that is provided as input to graphics pipeline 1120. In some embodiments, if tessellation is not used, tessellation components (e.g., hull shader 1111, tessellator 1113, and domain shader 1117) can be bypassed.

In some embodiments, complete geometric objects can be processed by a geometry shader 1119 via one or more threads dispatched to execution units 1152A, 1152B, or can proceed directly to the clipper 1129. In some embodiments, the geometry shader operates on entire geometric objects, rather than vertices or patches of vertices as in previous stages of the graphics pipeline. If the tessellation is disabled the geometry shader 1119 receives input from the vertex shader 1107. In some embodiments, geometry shader 1119 is programmable by a geometry shader program to perform geometry tessellation if the tessellation units are disabled.

Before rasterization, a clipper 1129 processes vertex data. The clipper 1129 may be a fixed function clipper or a programmable clipper having clipping and geometry shader functions. In some embodiments, a rasterizer and depth test component 1173 in the render output pipeline 1170 dispatches pixel shaders to convert the geometric objects into their per pixel representations. In some embodiments, pixel shader logic is included in thread execution logic 1150. In some embodiments, an application can bypass the rasterizer and depth test component 1173 and access un-rasterized vertex data via a stream out unit 1123.

The graphics processor 1100 has an interconnect bus, interconnect fabric, or some other interconnect mechanism that allows data and message passing amongst the major components of the processor. In some embodiments, execution units 1152A, 1152B and associated cache(s) 1151, texture and media sampler 1154, and texture/sampler cache 1158 interconnect via a data port 1156 to perform memory access and communicate with render output pipeline components of the processor. In some embodiments, sampler 1154, caches 1151, 1158 and execution units 1152A, 1152B each have separate memory access paths.

In some embodiments, render output pipeline 1170 contains a rasterizer and depth test component 1173 that converts vertex-based objects into an associated pixel-based representation. In some embodiments, the rasterizer logic includes a windower/masker unit to perform fixed function triangle and line rasterization. An associated render cache 1178 and depth cache 1179 are also available in some embodiments. A pixel operations component 1177 performs pixel-based operations on the data, though in some instances, pixel operations associated with 2D operations (e.g. bit block image transfers with blending) are performed by the 2D engine 1141, or substituted at display time by the display controller 1143 using overlay display planes. In some embodiments, a shared L3 cache 1175 is available to all graphics components, allowing the sharing of data without the use of main system memory.

In some embodiments, graphics processor media pipeline 1130 includes a media engine 1137 and a video front end 1134. In some embodiments, video front end 1134 receives pipeline commands from the command streamer 1103. In some embodiments, media pipeline 1130 includes a separate command streamer. In some embodiments, video front-end 1134 processes media commands before sending the command to the media engine 1137. In some embodiments, media engine 1137 includes thread spawning functionality to spawn threads for dispatch to thread execution logic 1150 via thread dispatcher 1131.

In some embodiments, graphics processor 1100 includes a display engine 1140. In some embodiments, display engine 1140 is external to processor 1100 and couples with the graphics processor via the ring interconnect 1102, or some other interconnect bus or fabric. In some embodiments, display engine 1140 includes a 2D engine 1141 and a display controller 1143. In some embodiments, display engine 1140 contains special purpose logic capable of operating independently of the 3D pipeline. In some embodiments, display controller 1143 couples with a display device (not shown), which may be a system integrated display device, as in a laptop computer, or an external display device attached via a display device connector.

In some embodiments, graphics pipeline 1120 and media pipeline 1130 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 12A is a block diagram illustrating a graphics processor command format 1200 according to some embodiments. FIG. 12B is a block diagram illustrating a graphics processor command sequence 1210 according to an embodiment. The solid lined boxes in FIG. 12A illustrate the components that are generally included in a graphics command while the dashed lines include components that are optional or that are only included in a sub-set of the graphics commands. The exemplary graphics processor command format 1200 of FIG. 12A includes data fields to identify a target client 1202 of the command, a command operation code (opcode) 1204, and the relevant data 1206 for the command. A sub-opcode 1205 and a command size 1208 are also included in some commands.

In some embodiments, client 1202 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1204 and, if present, sub-opcode 1205 to determine the operation to perform. The client unit performs the command using information in data field 1206. For some commands an explicit command size 1208 is expected to specify the size of the command. In some embodiments, the command parser automatically determines the size of at least some of the commands based on the command opcode. In some embodiments commands are aligned via multiples of a double word.

The flow diagram in FIG. 12B shows an exemplary graphics processor command sequence 1210. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1210 may begin with a pipeline flush command 1212 to cause any active graphics pipeline to complete the currently pending commands for the pipeline. In some embodiments, the 3D pipeline 1222 and the media pipeline 1224 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1212 can be used for pipeline synchronization or before placing the graphics processor into a low power state.

In some embodiments, a pipeline select command 1213 is used when a command sequence requires the graphics processor to explicitly switch between pipelines. In some embodiments, a pipeline select command 1213 is required only once within an execution context before issuing pipeline commands unless the context is to issue commands for both pipelines. In some embodiments, a pipeline flush command is 1212 is required immediately before a pipeline switch via the pipeline select command 1213.

In some embodiments, a pipeline control command 1214 configures a graphics pipeline for operation and is used to program the 3D pipeline 1222 and the media pipeline 1224. In some embodiments, pipeline control command 1214 configures the pipeline state for the active pipeline. In one embodiment, the pipeline control command 1214 is used for pipeline synchronization and to clear data from one or more cache memories within the active pipeline before processing a batch of commands.

In some embodiments, return buffer state commands 1216 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1216 includes selecting the size and number of return buffers to use for a set of pipeline operations.

The remaining commands in the command sequence differ based on the active pipeline for operations. Based on a pipeline determination 1220, the command sequence is tailored to the 3D pipeline 1222 beginning with the 3D pipeline state 1230 or the media pipeline 1224 beginning at the media pipeline state 1240.

The commands to configure the 3D pipeline state 1230 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 1230 commands are also able to selectively disable or bypass certain pipeline elements if those elements will not be used.

In some embodiments, 3D primitive 1232 command is used to submit 3D primitives to be processed by the 3D pipeline. Commands and associated parameters that are passed to the graphics processor via the 3D primitive 1232 command are forwarded to the vertex fetch function in the graphics pipeline. The vertex fetch function uses the 3D primitive 1232 command data to generate vertex data structures. The vertex data structures are stored in one or more return buffers. In some embodiments, 3D primitive 1232 command is used to perform vertex operations on 3D primitives via vertex shaders. To process vertex shaders, 3D pipeline 1222 dispatches shader execution threads to graphics processor execution units.

In some embodiments, 3D pipeline 1222 is triggered via an execute 1234 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1210 follows the media pipeline 1224 path when performing media operations. In general, the specific use and manner of programming for the media pipeline 1224 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1224 is configured in a similar manner as the 3D pipeline 1222. A set of commands to configure the media pipeline state 1240 are dispatched or placed into a command queue before the media object commands 1242. In some embodiments, media pipeline state commands 1240 include data to configure the media pipeline elements that will be used to process the media objects. This includes data to configure the video decode and video encode logic within the media pipeline, such as encode or decode format. In some embodiments, media pipeline state commands 1240 also support the use of one or more pointers to "indirect" state elements that contain a batch of state settings.

In some embodiments, media object commands 1242 supply pointers to media objects for processing by the media pipeline. The media objects include memory buffers containing video data to be processed. In some embodiments, all media pipeline states must be valid before issuing a media object command 1242. Once the pipeline state is configured and media object commands 1242 are queued, the media pipeline 1224 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 13:
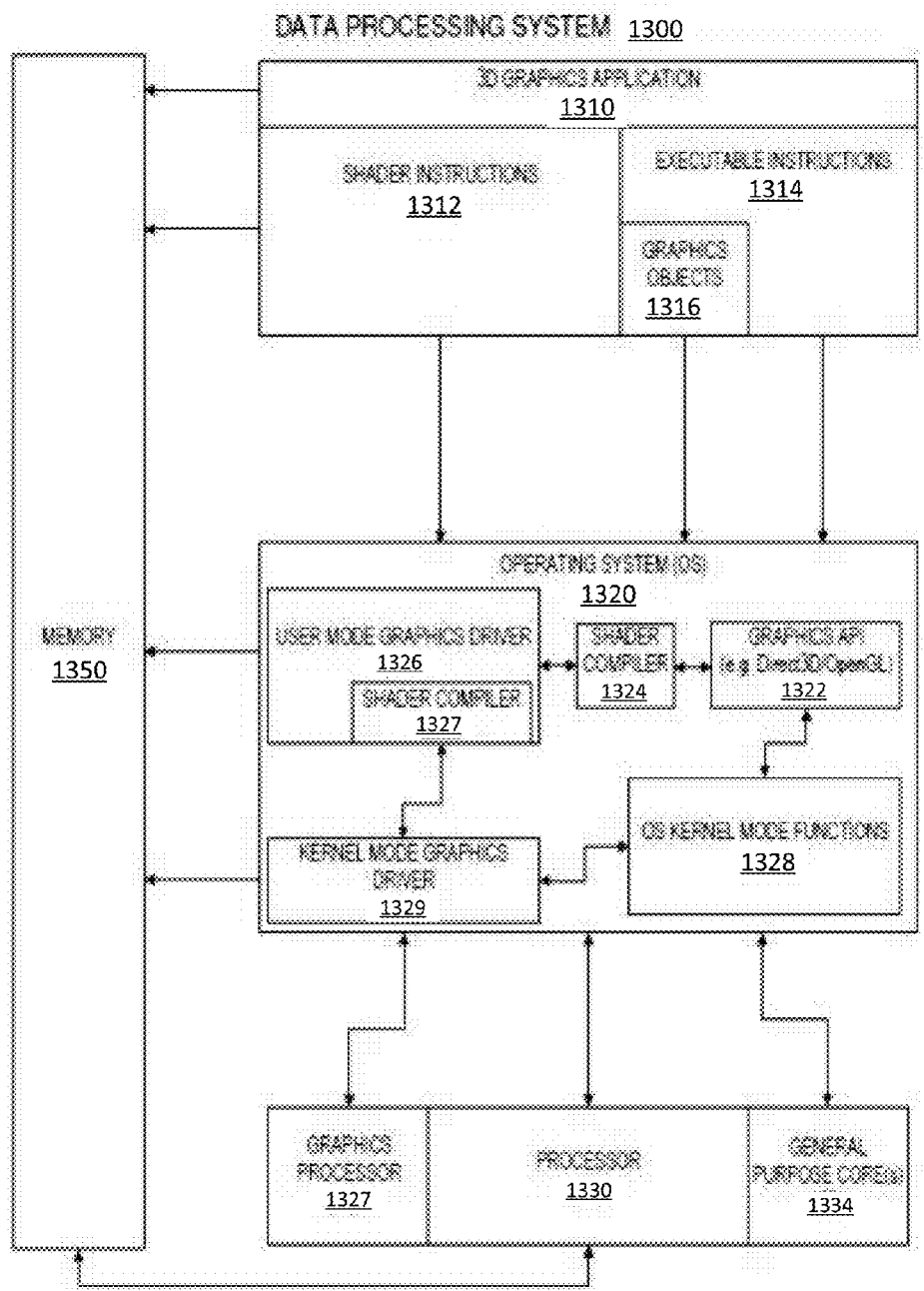
FIG. 13 illustrates exemplary graphics software architecture for a data processing system according to an embodiment.

FIG. 13 illustrates exemplary graphics software architecture for a data processing system 1300 according to some embodiments. In some embodiments, software architecture includes a 3D graphics application 1310, an operating system 1320, and at least one processor 1330. In some embodiments, processor 1330 includes a graphics processor 1332 and one or more general-purpose processor core(s) 1334. The graphics application 1310 and operating system 1320 each execute in the system memory 1350 of the data processing system.

In some embodiments, 3D graphics application 1310 contains one or more shader programs including shader instructions 1312. The shader language instructions may be in a high-level shader language, such as the High Level Shader Language (HLSL) or the OpenGL Shader Language (GLSL). The application also includes executable instructions 1314 in a machine language suitable for execution by the general-purpose processor core 1334. The application also includes graphics objects 1316 defined by vertex data.

In some embodiments, operating system 1320 is a Microsoft® Windows® operating system from the Microsoft Corporation, a proprietary UNIX-like operating system, or an open source UNIX-like operating system using a variant of the Linux kernel. The operating system 1320 can support a graphics API 1022 such as the Direct3D API, the OpenGL API, or the Vulkan API. When the Direct3D API is in use, the operating system 1320 uses a front-end shader compiler 1324 to compile any shader instructions 1312 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1310. In some embodiments, the shader instructions 1312 are provided in an intermediate form, such as a version of the Standard Portable Intermediate Representation (SPIR) used by the Vulkan API.

In some embodiments, user mode graphics driver 1326 contains a back-end shader compiler 1327 to convert the shader instructions 1312 into a hardware specific representation. When the OpenGL API is in use, shader instructions 1312 in the GLSL high-level language are passed to a user mode graphics driver 1326 for compilation. In some embodiments, user mode graphics driver 1326 uses operating system kernel mode functions 1328 to communicate with a kernel mode graphics driver 1329. In some embodiments, kernel mode graphics driver 1329 communicates with graphics processor 1332 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 14:
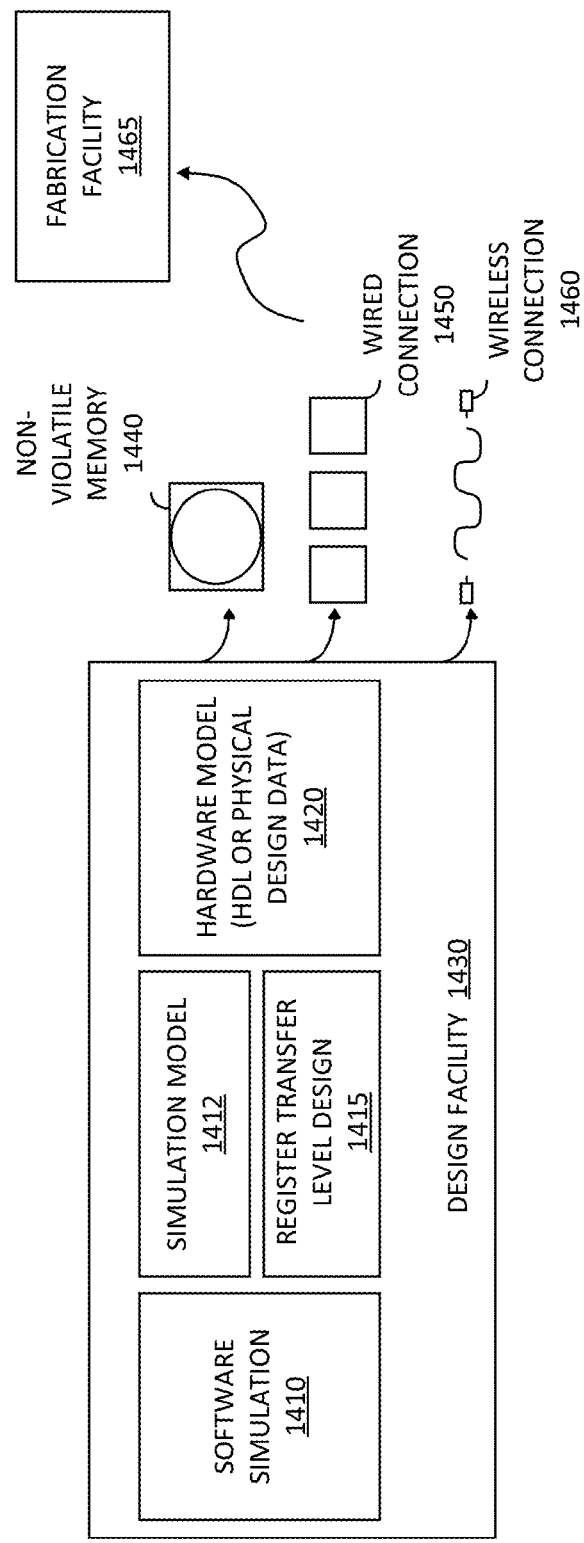
FIG. 14 is a block diagram illustrating an IP core development system that may be used to manufacture an integrated circuit to perform operations according to an embodiment.

FIG. 14 is a block diagram illustrating an IP core development 1400 that may be used to manufacture an integrated circuit to perform operations according to an embodiment. The IP core development system 1400 may be used to generate modular, re-usable designs that can be incorporated into a larger design or used to construct an entire integrated circuit (e.g., an SOC integrated circuit). A design facility 1430 can generate a software simulation 1410 of an IP core design in a high level programming language (e.g., C/C++). The software simulation 1410 can be used to design, test, and verify the behavior of the IP core using a simulation model 1412. The simulation model 1412 may include functional, behavioral, and/or timing simulations. A register transfer level (RTL) design can then be created or synthesized from the simulation model 1400. The RTL design 1415 is an abstraction of the behavior of the integrated circuit that models the flow of digital signals between hardware registers, including the associated logic performed using the modeled digital signals. In addition to an RTL design 1415, lower-level designs at the logic level or transistor level may also be created, designed, or synthesized. Thus, the particular details of the initial design and simulation may vary.

The RTL design 1415 or equivalent may be further synthesized by the design facility into a hardware model 1420, which may be in a hardware description language (HDL), or some other representation of physical design data. The HDL may be further simulated or tested to verify the IP core design. The IP core design can be stored for delivery to a $3^{rd}$ party fabrication facility 1465 using non-volatile memory 1440 (e.g., hard disk, flash memory, or any non-volatile storage medium). Alternatively, the IP core design may be transmitted (e.g., via the Internet) over a wired connection 1450 or wireless connection 1460. The fabrication facility 1465 may then fabricate an integrated circuit that is based at least in part on the IP core design. The fabricated integrated circuit can be configured to perform operations in accordance with at least one embodiment described herein.

Exemplary System on a Chip Integrated Circuit

Figure 15:
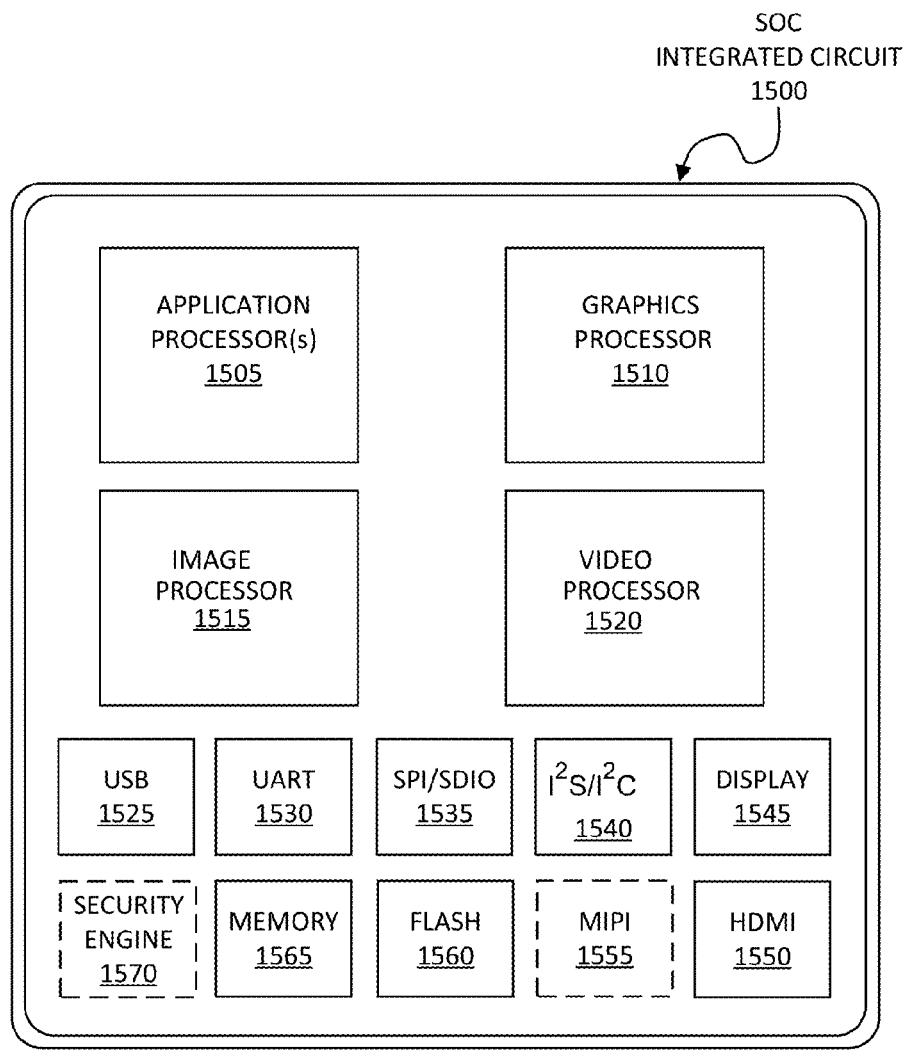
FIG. 15 is a block diagram illustrating an exemplary system on a chip integrated circuit that may be fabricated using one or more IP cores, according to an embodiment.
Figure 16:
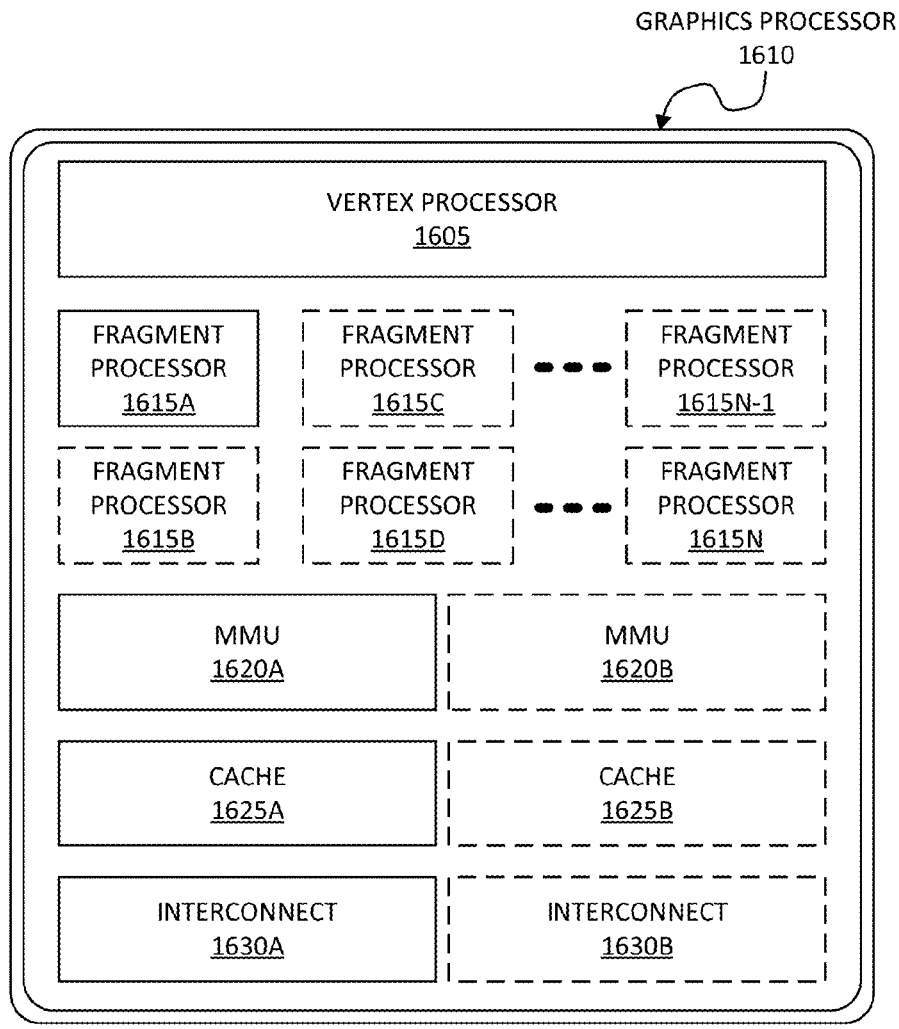
FIG. 16 is a block diagram illustrating an exemplary graphics processor of a system on a chip integrated circuit that may be fabricated using one or more IP cores, according to an embodiment.
Figure 17:
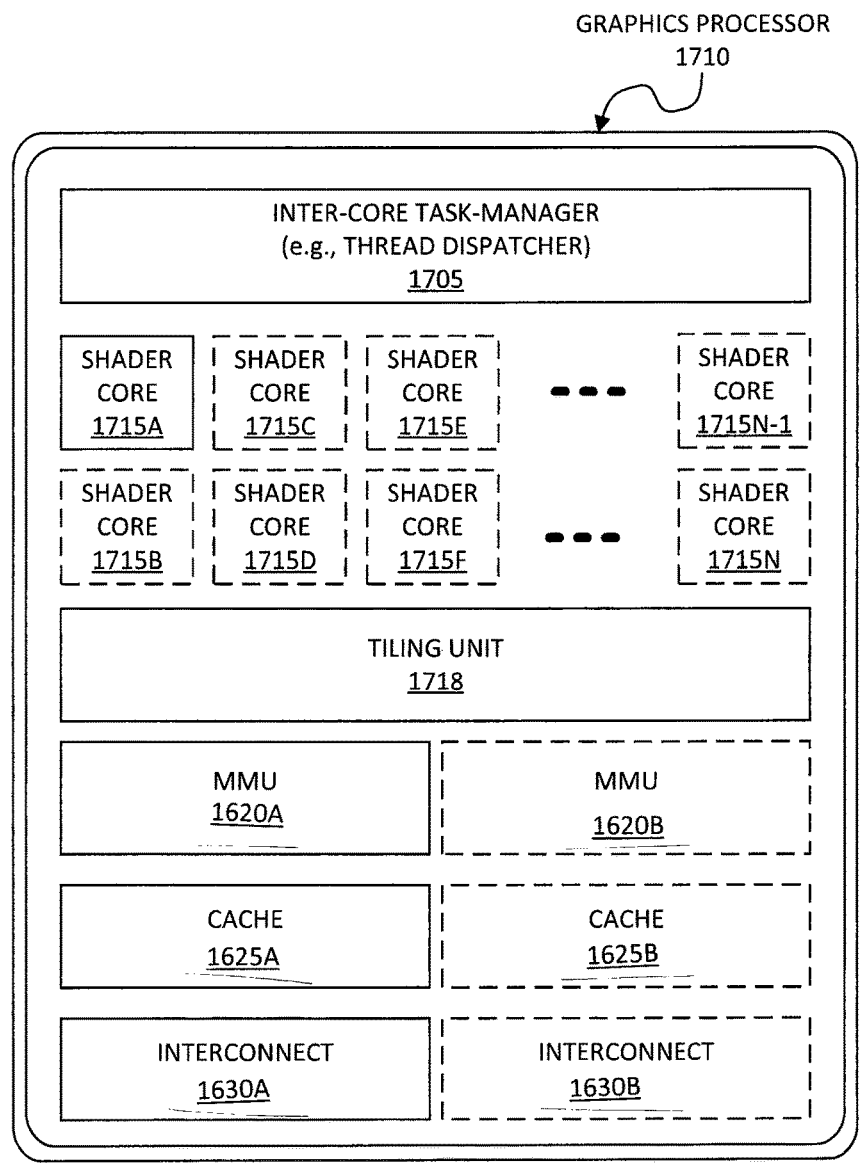
FIG. 17 is a block diagram illustrating an additional exemplary graphics processor of a system on a chip integrated circuit that may be fabricated using one or more IP cores, according to an embodiment.

FIGS. 15-17 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 15 is a block diagram illustrating an exemplary system on a chip integrated circuit 1500 that may be fabricated using one or more IP cores, according to an embodiment. Exemplary integrated circuit 1500 includes one or more application processor(s) 1505 (e.g., CPUs), at least one graphics processor 1510, and may additionally include an image processor 1515 and/or a video processor 1520, any of which may be a modular IP core from the same or multiple different design facilities. Integrated circuit 1500 includes peripheral or bus logic including a USB controller 1525, UART controller 1530, an SPI/SDIO controller 1535, and an I²S/I²C controller 1540. Additionally, the integrated circuit can include a display device 1545 coupled to one or more of a high-definition multimedia interface (HDMI) controller 1550 and a mobile industry processor interface (MIPI) display interface 1555. Storage may be provided by a flash memory subsystem 1560 including flash memory and a flash memory controller. Memory interface may be provided via a memory controller 1565 for access to SDRAM or SRAM memory devices. Some integrated circuits additionally include an embedded security engine 1570.

Additionally, other logic and circuits may be included in the processor of integrated circuit 1500, including additional graphics processors/cores, peripheral interface controllers, or general purpose processor cores.

FIG. 16 is a block diagram illustrating an exemplary graphics processor 1610 of a system on a chip integrated circuit that may be fabricated using one or more IP cores, according to an embodiment. Graphics processor 1610 can be a variant of the graphics processor 1510 of FIG. 15. Graphics processor 1610 includes a vertex processor 1605 and one or more fragment processor(s) 1615A-1615N (e.g., 1615A, 1615B, 1615C, 1615D, through 1615N-1, and 1615N). Graphics processor 1610 can execute different shader programs via separate logic, such that the vertex processor 1605 is optimized to execute operations for vertex shader programs, while the one or more fragment processor(s) 1615A-1615N execute fragment (e.g., pixel) shading operations for fragment or pixel shader programs. The vertex processor 1605 performs the vertex processing stage of the 3D graphics pipeline and generates primitives and vertex data. The fragment processor(s) 1615A-1615N use the primitive and vertex data generated by the vertex processor 1605 to produce a framebuffer that is displayed on a display device. In one embodiment, the fragment processor(s) 1615A-1615N are optimized to execute fragment shader programs as provided for in the OpenGL API, which may be used to perform similar operations as a pixel shader program as provided for in the Direct 3D API.

Graphics processor 1610 additionally includes one or more memory management units (MMUs) 1620A-1620B, cache(s) 1625A-1625B, and circuit interconnect(s) 1630A-1630B. The one or more MMU(s) 1620A-1620B provide for virtual to physical address mapping for integrated circuit 1610, including for the vertex processor 1605 and/or fragment processor(s) 1615A-1615N, which may reference vertex or image/texture data stored in memory, in addition to vertex or image/texture data stored in the one or more cache(s) 1625A-1625B. In one embodiment the one or more MMU(s) 1625A-1625B may be synchronized with other MMUs within the system, including one or more MMUs associated with the one or more application processor(s) 1005, image processor 1515, and/or video processor 1520 of FIG. 15, such that each processor 1505-1520 can participate in a shared or unified virtual memory system. The one or more circuit interconnect(s) 1630A-1630B enable graphics processor 1610 to interface with other IP cores within the SoC, either via an internal bus of the SoC or via a direct connection, according to embodiments.

FIG. 17 is a block diagram illustrating an additional exemplary graphics processor 1710 of a system on a chip integrated circuit that may be fabricated using one or more IP cores, according to an embodiment. Graphics processor 1710 can be a variant of the graphics processor 1510 of FIG. 15. Graphics processor 1710 includes the one or more MMU(s) 1620A-1620B, caches 1625A-1625B, and circuit interconnects 1630A-1630B of the integrated circuit 1600 of FIG. 16.

Graphics processor 1710 includes one or more shader core(s) 1715A-1715N (e.g., 1715A, 1715B, 1715C, 1715D, 1715E, 1715F, through 1615N-1, and 1615N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1710 includes an inter-core task manager 1705, which acts as a thread dispatcher to dispatch execution threads to one or more shader cores 1715A-1715N and a tiling unit 1718 to accelerate tiling operations for tile-based rendering, in which rendering operations for a scene are subdivided in image space, for example to exploit local spatial coherence within a scene or to optimize use of internal caches.

Additional and Alternative Implementation Notes

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. § 112(f) or paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. 112(f) or paragraph 6.

To the extent various operations or functions are described herein, they can be described or defined as hardware circuitry, software code, instructions, configuration, and/or data. The content can be embodied in hardware logic, or as directly executable software ("object" or "executable" form), source code, high-level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

In Example 1: A graphics processing unit (GPU), the GPU comprising: one or more graphics cores configured to process computer graphics, the one or more graphics cores being further configured to operate with a memory; the one or more graphics cores being further configured to: obtain a mode tracker metadata that stores a mode-indicative value, the mode-tracker metadata being stored in the memory, that corresponds to a multi-sample pixel that is stored in the memory; based on the obtained mode-indicative value, determine whether the pixel is stored with a separate color per sample or is stored as fragment data, wherein the fragment data includes a color value for each fragment covering one or more of the samples of the pixel and a mapping to specify which fragment covers each sample.

In Example 2: A GPU as recited in Example 1, wherein the fragment data being stored in a fragment color set in the memory, the fragment color set having a memory footprint, the sample-to-fragment map occupying the memory footprint of the fragment color set.

In Example 3: A GPU as recited in Example 1, wherein: the fragment data being stored in a fragment color set in the memory, the fragment color set having a number (N) of fragment slots, each slot configured to store one color value; each sample entry in the sample-to-fragment map having a bit-length of no more than ceiling(log(N)) base 2.

In Example 4: A GPU as recited in Example 1, wherein the one or more graphics cores being further configured to: distinguish whether all samples are covered by a single fragment or by multiple fragments; write a sample-to-fragment map only in latter case.

In Example 5: A GPU as recited in Example 1, wherein the one or more graphics cores being further configured to: determine that the number of fragments covering the one or more of the multiple samples of the multi-sample pixel exceeds one; in response, write a sample-to-fragment map to memory.

In Example 6: A GPU as recited in Example 1, wherein the one or more graphics cores being further configured to: write a sample-to-fragment map to memory for N fragments that cover the pixel where the number of bits per sample map entry is no more than ceiling(log(N)) in base 2.

In Example 7: A GPU as recited in Example 1, wherein the one or more graphics cores being further configured to: write a sample-to-fragment map to memory; apply lossless block compression to the sample-to-fragment map stored in the memory.

In Example 8: A GPU as recited in Example 1, wherein the one or more graphics cores being further configured to: apply lossless block compression to a combination of the sample color set, fragment color set, and a sample-to-fragment map; store the block compressed combination in the memory.

In Example 9: A graphics processing unit (GPU), the GPU comprising: one or more graphics cores configured to process computer graphics, the one or more graphics cores being further configured to operate with a memory; the one or more graphics cores being further configured to: read a mode-indicator value from a fragment-coverage metadata corresponding to a multi-sample pixel from the memory, wherein the multi-sample pixel has multiple samples; obtain color data from memory of the pixel corresponding to the mode-indicator value; obtain fragment data of a new fragment that, at least, partially covers the multi-sample pixel from the memory; combine the obtained color data of the pixel with the obtained fragment data of the new fragment; write results of the combination and update mode-indicator value of the fragment-coverage metadata.

In Example 10: A GPU as recited in Example 9, wherein the one or more graphics cores being further configured to determine a number of unique colors utilized by the samples of the pixel after setting the covered samples to the new fragment color and compare this to a maximum number of fragments that can be stored when the pixel is in fragment mode.

In Example 11: A GPU as recited in Example 9, wherein the one or more graphics cores being further configured to in response to the number of colors determined is greater than the maximum number of fragments that can be stored when the pixel is in fragment mode, set the set the mode tracker to sample mode and write out a color per sample.

In Example 12: A GPU as recited in Example 9, wherein the one or more graphics cores being further configured to in response to the number of colors determined is not greater than the maximum number of fragments that can be stored when the pixel is in fragment mode, the pixel to fragment mode and write out the fragment colors together with sample to fragment mapping data that specifies which fragment covers each sample.

In Example 13: A GPU as recited in Example 9, wherein the one or more graphics cores being further configured to: determine whether the new fragment covers all the samples of the pixel, and if so set the mode tracker to indicate a single fragment and write the new fragment color to the pixel.

In Example 14: A GPU as recited in Example 9, wherein the one or more graphics cores being further configured to: obtain fragment data of a new fragment that partially covers the multi-sample pixel from the memory and replaces the colors at the samples that it covers with a new fragment color; determine that the multi-sample pixel is a fragment mode based upon the read mode-indicator value of the fragment-coverage metadata; in response to a determination that the number of fragment colors stored in the pixel is less than the maximum number that can be stored, read the sample to fragment map, write the fragment color of the new fragment to the pixel, and set the mode tracker meta-data to indicate that one additional fragment is covered.

In Example 15: A GPU as recited in Example 14, wherein, in response to a determination that the new fragment is opaque, the new fragment covers only some but not all of the multiple samples, and a sample-to-fragment map indicates that the pixel is already covered by less than a maximum number of fragments ("max-frag-color"), the one or more graphics cores are further configured to: reads sample-to-fragment map that links each sample of the multi-sample pixel to one of the one or more fragments that covers at least one of the multiple samples of the multi-sample pixel; determine which fragment slot of a fragment color set is open and available, a fragment color set a number of fragment slots equal to the max-frag; write a fragment color of the new fragment to an open and available fragment slot of the fragment color set.

In Example 16: A GPU as recited in Example 9, wherein the one or more graphics cores being further configured to: compute new colors to be stored per sample or groups of samples in a multi-sample pixel that has associated mode-tracker meta-data that specifies whether the pixel is stored in sample-mode, with a separate color per sample, or in fragment-mode, with a list of fragment colors and a mapping of which sample is covered by which fragment; compare the number of such colors covering the multi-sample pixel to a maximum number of fragments ("max-frag") colors that are able to be stored in fragment mode; in response to the number of fragment colors covering the multi-sample pixel exceeding the max-frag colors, set the mode tracker to indicate sample mode, write a color per sample in a sample color set and update a sample-to-fragment map to indicate a sample-mode; in response to the number of unique colors not exceeding the max-frag colors, set the mode tracker to indicate fragment mode write the colors into the fragment color set and update a sample-to-fragment map to indicate which fragment covers each sample.

In Example 17: One or more computer-readable media storing instructions thereon that, when executed by one or more processors, direct the one or more processors to perform operations comprising: obtaining a mode tracker metadata that stores a mode-indicative value, the mode-tracker metadata being stored in a memory, that corresponds to a multi-sample pixel that is stored in the memory; based on the obtained mode-indicative value, determining whether the pixel is stored with a separate color per sample or is stored as fragment data, wherein the fragment data includes a color value for each fragment covering one or more of the samples of the pixel and a mapping to specify which fragment covers each sample.

In Example 18: One or more computer-readable media of Example 17, wherein the fragment data being stored in a fragment color set in the memory, the fragment color set having a memory footprint, the sample-to-fragment map occupying the memory footprint of the fragment color set.

In Example 19: One or more computer-readable media of Example 17, wherein: the fragment data being stored in a fragment color set in the memory, the fragment color set having a number (N) of fragment slots, each slot configured to store one color value; each sample entry in the sample-to-fragment map having a bit-length of no more than ceiling (log(N)) base 2.

In Example 20: One or more computer-readable media of Example 17, wherein the operations further comprise: distinguishing whether all samples are covered by a single fragment or by multiple fragments; writing a sample-to-fragment map only in latter case.

In Example 21: One or more computer-readable media of Example 17, wherein the operations further comprise: Determining that the number of fragments covering the one or more of the multiple samples of the multi-sample pixel exceeds one; in response, writing a sample-to-fragment map to memory.

In Example 22: One or more computer-readable media of Example 17, wherein the operations further comprise: writing a sample-to-fragment map to memory for N fragments that cover the pixel where the number of bits per sample map entry is no more than ceiling(log(N)) in base 2.

In Example 23: One or more computer-readable media of Example 17, wherein the operations further comprise: writing a sample-to-fragment map to memory; applying lossless block compression to the sample-to-fragment map stored in the memory.

In Example 24: One or more computer-readable media of Example 17, wherein the operations further comprise: applying lossless block compression to a combination of the sample color set, fragment color set, and a sample-to-fragment map; storing the block compressed combination in the memory.

In Example 25: One or more computer-readable media storing instructions thereon that, when executed by one or more processors, direct the one or more processors to perform operations comprising: reading a mode-indicator value from a fragment-coverage metadata corresponding to a multi-sample pixel from a memory, wherein the multi-sample pixel has multiple samples; obtaining color data from memory of the pixel corresponding to the mode-indicator value; obtaining fragment data of a new fragment that, at least, partially covers the multi-sample pixel from a memory; combining the obtained color data of the pixel with the obtained fragment data of the new fragment; writing results of the combination and update mode-indicator value of the fragment-coverage metadata.

In Example 26: One or more computer-readable media of Example 25, wherein the operations further comprise determining a number of unique colors utilized by the samples of the pixel after setting the covered samples to the new fragment color and comparing this to a maximum number of fragments that can be stored when the pixel is in fragment mode.

In Example 27: One or more computer-readable media of Example 25, wherein the operations further comprise, in response to the number of colors determined is greater than the maximum number of fragments that can be stored when the pixel is in fragment mode, setting the set the mode tracker to sample mode and write out a color per sample.

In Example 28: One or more computer-readable media of Example 25, wherein the operations further comprise, in response to the number of colors determined is not greater than the maximum number of fragments that can be stored when the pixel is in fragment mode, setting the pixel to fragment mode and write out the fragment colors together with sample to fragment mapping data that specifies which fragment covers each sample.

In Example 29: One or more computer-readable media of Example 25, wherein the operations further comprise: determining whether the new fragment covers all the samples of the pixel, and if so set the mode tracker to indicate a single fragment and write the new fragment color to the pixel, In Example 30: One or more computer-readable media of Example 25, wherein the operations further comprise: obtaining fragment data of a new fragment that partially covers the multi-sample pixel from the memory and replaces the colors at the samples that it covers with a new fragment color; determining that the multi-sample pixel is a fragment mode based upon the read mode-indicator value of the fragment-coverage metadata; in response to a determination that the number of fragment colors stored in the pixel is less than the maximum number that can be stored, reading the sample to fragment map, write the fragment color of the new fragment to the pixel, and setting the mode tracker meta-datato indicate that one additional fragment is covered.

In Example 31: One or more computer-readable media of Example 30, wherein, in response to a determination that the new fragment is opaque, the new fragment covers only some but not all of the multiple samples, and a sample-to-fragment map indicates that the pixel is already covered by less than a maximum number of fragments ("max-frag-color"), the operations further comprise: reading sample-to-fragment map that links each sample of the multi-sample pixel to one of the one or more fragments that covers at least one of the multiple samples of the multi-sample pixel; determining which fragment slot of a fragment color set is open and available, a fragment color set a number of fragment slots equal to the max-frag; writing a fragment color of the new fragment to an open and available fragment slot of the fragment color set.

In Example 32: One or more computer-readable media of Example 25, wherein the operations further comprise: computing new colors to be stored per sample or groups of samples in a multi-sample pixel that has associated mode-tracker meta-data that specifies whether the pixel is stored in sample-mode, with a separate color per sample, or in fragment-mode, with a list of fragment colors and a mapping of which sample is covered by which fragment; comparing the number of such colors covering the multi-sample pixel to a maximum number of fragments ("max-frag") colors that are able to be stored in fragment mode; in response to the number of fragment colors covering the multi-sample pixel exceeding the max-frag colors, setting the mode tracker to indicate sample mode, write a color per sample in a sample color set and update a sample-to-fragment map to indicate a sample-mode; in response to the number of unique colors not exceeding the max-frag colors, setting the mode tracker to indicate fragment mode write the colors into the fragment color set and updating a sample-to-fragment map to indicate which fragment covers each sample.

In Example 33: A computer graphics system comprising: a mode tracker configured to obtain a mode tracker metadata that stores a mode-indicative value, the mode-tracker metadata being stored in a memory, that corresponds to a multi-sample pixel that is stored in the memory; the mode tracker being further configured to, based on the obtained mode-indicative value, determine whether the pixel is stored with a separate color per sample or is stored as fragment data, wherein the fragment data includes a color value for each fragment covering one or more of the samples of the pixel and a mapping to specify which fragment covers each sample.

In Example 34: A computer graphics system of Example 33, wherein the fragment data being stored in a fragment color set in the memory, the fragment color set having a memory footprint, the sample-to-fragment map occupying the memory footprint of the fragment color set.

In Example 35: A computer graphics system of Example 33, wherein: the fragment data being stored in a fragment color set in the memory, the fragment color set having a number (N) of fragment slots, each slot configured to store one color value; each sample entry in the sample-to-fragment map having a bit-length of no more than ceiling(log (N)) base 2.

In Example 36: A computer graphics system of Example 33, wherein the system further comprises: a fragment coverage handler configured to distinguish whether all samples are covered by a single fragment or by multiple fragments; a map updater configured to write a sample-to-fragment map only in latter case.

In Example 37: A computer graphics system of Example 33, wherein the system further comprises: a fragment coverage handler configured to determine that the number of fragments covering the one or more of the multiple samples of the multi-sample pixel exceeds one; a map updater configured to, in response, write a sample-to-fragment map to memory.

In Example 38: A computer graphics system of Example 33, wherein the system further comprises: a map updater configured to write a sample-to-fragment map to memory for N fragments that cover the pixel where the number of bits per sample map entry is no more than ceiling(log(N)) in base 2.

In Example 39: A computer graphics system of Example 33, wherein the system further comprises: a map updater configured to write a sample-to-fragment map to memory; a compressor configured to apply lossless block compression to the sample-to-fragment map stored in the memory.

In Example 40: A computer graphics system of Example 33, wherein the system further comprises: a compressor configured to apply lossless block compression to a combination of the sample color set, fragment color set, and a sample-to-fragment map; a memory handler configured to store the block compressed combination in the memory.

In Example 41: A computer graphics system comprising: a mode tracker configured to read a mode-indicator value from a fragment-coverage metadata corresponding to a multi-sample pixel from the memory, wherein the multi-sample pixel has multiple samples; a pixel handler configured to: obtain color data from memory of the pixel corresponding to the mode-indicator value; obtain fragment data of a new fragment that, at least, partially covers the multi-sample pixel from the memory; combine the obtained color data of the pixel with the obtained fragment data of the new fragment; the pixel handler being further configured to write results of the combination and the mode tracker being further configured to update mode-indicator value of the fragment-coverage metadata.

In Example 42: A computer graphics system of Example 41, wherein the pixel handler is further configured to determine a number of unique colors utilized by the samples of the pixel after setting the covered samples to the new fragment color and compare this to a maximum number of fragments that can be stored when the pixel is in fragment mode.

In Example 43: A computer graphics system of Example 41, wherein the pixel handler is further configured to, in response to the number of colors determined is greater than the maximum number of fragments that can be stored when the pixel is in fragment mode, set the set the mode tracker to sample mode and write out a color per sample.

In Example 44: A computer graphics system of Example 41, wherein the pixel handler is further configured to, in response to the number of colors determined is not greater than the maximum number of fragments that can be stored when the pixel is in fragment mode, the pixel to fragment mode and write out the fragment colors together with sample to fragment mapping data that specifies which fragment covers each sample.

In Example 45: A computer graphics system of Example 41, wherein the pixel handler is further configured to: determine whether the new fragment covers all the samples of the pixel, and if so set the mode tracker to indicate a single fragment and write the new fragment color to the pixel, In Example 46: A computer graphics system of Example 41, wherein the pixel handler is further configured to: obtain fragment data of a new fragment that partially covers the multi-sample pixel from the memory and replaces the colors at the samples that it covers with a new fragment color; determine that the multi-sample pixel is a fragment mode based upon the read mode-indicator value of the fragment-coverage metadata; in response to a determination that the number of fragment colors stored in the pixel is less than the maximum number that can be stored, read the sample to fragment map, write the fragment color of the new fragment to the pixel, and set the mode tracker meta-datato indicate that one additional fragment is covered.

In Example 47: A computer graphics system of Example 46, wherein, in response to a determination that the new fragment is opaque, the new fragment covers only some but not all of the multiple samples, and a sample-to-fragment map indicates that the pixel is already covered by less than a maximum number of fragments ("max-frag-color"), the pixel handler is further configured to: read sample-to-fragment map that links each sample of the multi-sample pixel to one of the one or more fragments that covers at least one of the multiple samples of the multi-sample pixel; determine which fragment slot of a fragment color set is open and available, a fragment color set a number of fragment slots equal to the max-frag; write a fragment color of the new fragment to an open and available fragment slot of the fragment color set.

In Example 48: A computer graphics system of Example 41, wherein the pixel handler is further configured to: compute new colors to be stored per sample or groups of samples in a multi-sample pixel that has associated mode-tracker meta-data that specifies whether the pixel is stored in sample-mode, with a separate color per sample, or in fragment-mode, with a list of fragment colors and a mapping of which sample is covered by which fragment; compare the number of such colors covering the multi-sample pixel to a maximum number of fragments ("max-frag") colors that are able to be stored in fragment mode; in response to the number of fragment colors covering the multi-sample pixel exceeding the max-frag colors, set the mode tracker to indicate sample mode, write a color per sample in a sample color set and update a sample-to-fragment map to indicate a sample-mode; in response to the number of unique colors not exceeding the max-frag colors, set the mode tracker to indicate fragment mode write the colors into the fragment color set and update a sample-to-fragment map to indicate which fragment covers each sample.

The invention claimed is:

1. A computer graphics processor comprising:
a memory; and
one or more graphics cores, coupled to the memory, the one or more graphics cores configured to:
obtain from the memory, for a multi-sample pixel stored in the memory, a mode tracker metadata that includes a mode-indicative value;
based on the obtained mode-indicative value, determine whether the multi-sample pixel is stored with a separate color per sample or as fragment data, wherein the fragment data includes: a color value for each fragment covering one or more samples of the multi-sample pixel, and a sample-to-fragment map that specifies which fragment covers each sample; and
when the multi-sample pixel is stored as fragment data, in response to determining that a number of fragments covering the one or more samples of the multi-sample pixel exceeds one, write the sample-to-fragment map to the memory.

2. The graphics processor as recited in claim 1, wherein the fragment data is stored in a fragment color set in the memory, the fragment color set having a memory footprint, and the sample-to-fragment map occupying the memory footprint of the fragment color set.

3. The graphics processor as recited in claim 1, wherein:
the fragment data is stored in a fragment color set in the memory, the fragment color set having a number (N) of fragment slots, and each slot being configured to store one color value; and
each sample entry in the sample-to-fragment map having a bit-length of no more than ceiling (log(N)) base 2.

4. The graphics processor as recited in claim 1, wherein the one or more graphics cores are further configured to:
distinguish whether the one or more all samples of the multi-sample pixel are covered by a single fragment or by multiple fragments; and
write a sample-to-fragment map only when the one or more samples of the multi-sample pixel are covered by multiple fragments.

5. The graphics processor as recited in claim 1, wherein the one or more graphics cores are further configured to:
write the sample-to-fragment map to memory for N fragments that cover the multi-sample pixel, where the number of bits per sample map entry is no more than ceiling (log(N)) in base 2.

6. The graphics processor as recited in claim 1, wherein the one or more graphics cores are further configured to:
write the sample-to-fragment map to memory; and
apply a lossless block compression to the sample-to-fragment map stored in the memory.

7. The graphics processor as recited in claim 1, wherein the one or more graphics cores are further configured to:
apply a lossless block compression to a combination of a sample color set, a fragment color set, and the sample-to-fragment map; and
store the block compressed combination in the memory.

8. A graphics processor comprising:
a memory; and
one or more graphics cores, coupled to the memory, the one or more graphics cores configured to:
read, from a fragment-coverage metadata stored in the memory, a mode-indicator value corresponding to a multi-sample pixel, wherein the multi-sample pixel has multiple samples;
obtain color data, the color data being obtained from memory of the multi-sample pixel corresponding to the mode-indicator value;
obtain, from the memory, fragment data of a new fragment than at least partially covers the multi-sample pixel;
combine the obtained color data of the multi-sample pixel corresponding to the mode indicator value with the obtained fragment data of the new fragment;
write results of the combination, and update the mode-indicator value of the fragment-coverage metadata;
determine a number of unique colors utilized by the samples of the multi-sample pixel after setting of samples of the multi-sample pixel covered by the new fragment to the new fragment color; and
compare the number of unique colors utilized by the samples to a maximum number of fragments that can be stored when the multi-sample pixel is in a fragment mode.

9. The graphics processor as recited in claim 8, wherein the one or more graphics cores are further configured to:
in response to the determined number of unique colors being greater than the maximum number of fragments that can be stored when the multi-sample pixel is in the fragment mode, set the mode-indicator value to indicate a sample mode and write out a color per sample.

10. The graphics processor as recited in claim 8, wherein the one or more graphics cores are further configured to:
in response to the determined number of unique colors not being greater than the maximum number of fragments that can be stored when the multi-sample pixel is in the fragment mode, set the mode-indicator value to indicate a fragment mode, and write out the fragment colors together with a sample-to-fragment map that specifies which fragment covers each sample.

11. The graphics processor as recited in claim 8, wherein the one or more graphics cores are further configured to:
determine whether the new fragment covers the samples of the multi-sample pixel; and
when the new fragment covers the samples of the multi-sample pixel, set the mode tracker to indicate a single fragment and write the new fragment color to the multi-sample pixel.

12. The graphics processor as recited in claim 8, wherein the one or more graphics cores further configured to:
obtain fragment data of a new fragment that partially covers the multi-sample pixel from the memory, and replace the colors at the samples that the new fragment covers with a new fragment color;
determine that the multi-sample pixel is a fragment mode based upon the read mode-indicator value of the fragment-coverage metadata; and
in response to the determined number of unique colors utilized by the samples of the multi-sample pixel being less than the maximum number of fragments that can be stored, read the sample-to-fragment map, write the fragment color of the new fragment to the multi-sample pixel, and set the mode tracker meta-data to indicate that one additional fragment is covered.

13. The graphics processor as recited in claim 12, wherein, in response to a determination that the new fragment is opaque, the new fragment covers some but not all of the samples of the multi-sample pixel, and a sample-to-fragment map indicates that the multi-sample pixel is already covered by less than a maximum number of fragments, the one or more graphics cores-are further configured to:
read sample-to-fragment map that links each sample of the multi-sample pixel to one of the one or more fragments that covers at least one of the samples of the multi-sample pixel;
determine which fragment slot of a fragment color set is open and available; and
write a fragment color of the new fragment to an open and available fragment slot of the fragment color set.

14. The graphics processor as recited in claim 8, wherein the one or more graphics cores are further configured to:
compute new colors to be stored per sample or groups of samples in a multi-sample pixel that has associated mode-tracker meta-data that specifies whether the multi-sample pixel is stored in a sample-mode, with a separate color per sample, or in the fragment-mode, with a list of fragment colors and a mapping of which sample is covered by which fragment;
compare the number of computed new colors covering the multi-sample pixel to a maximum number of fragment colors that are able to be stored in the fragment mode;
in response to the number of computed new colors covering the multi-sample pixel exceeding the maximum number of fragment colors, set the mode tracker to indicate the sample mode, write a color per sample in a sample color set, and update a sample-to-fragment map to indicate the sample-mode; and in response to the number of unique colors not exceeding the maximum number of fragment colors, set the mode tracker to indicate the fragment mode, write the colors into a fragment color set, and update the sample-to-fragment map to indicate which fragment covers each sample.

15. A graphics processor comprising:
a memory configured to store a mode tracker as fragment-coverage metadata having a mode-indicator value corresponding to a multi-sample pixel; and
one or more graphics cores configured to:
read the mode-indicator value from the memory;
  obtain, from the memory, color data of the multi-sample pixel corresponding to the mode-indicator value;
  obtain, from the memory, fragment data of a new fragment than at least partially covers the multi-sample pixel;
  combine the obtained color data of the multi-sample pixel corresponding to the mode indicator value with the obtained fragment data of the new fragment;
  determine a number of unique colors that are utilized by the samples of the multi-sample pixel after setting the covered samples to the new fragment color; and
  compare the determined number of unique colors to a maximum number of fragments that can be stored when the multi-sample pixel is in a fragment mode.

16. The computer graphics system of claim 15, wherein the one or more graphics cores are further configured to,
  in response to the determined number of unique colors being greater than the maximum number of fragments that can be stored when the multi-sample pixel is in the fragment mode, set the mode tracker to a sample mode and write out a color per sample.

17. The computer graphics system of claim 15, wherein the one or more graphics cores are further configured to write results of the combination of the obtained color data of the multi-sample pixel corresponding to the mode indicator value with the obtained fragment data of the new fragment, and to update the mode-indicator value of the fragment-coverage metadata.

* * * * *